United States Patent
Kawasaki et al.

(10) Patent No.: US 11,844,002 B2
(45) Date of Patent: Dec. 12, 2023

(54) ENVIRONMENTAL INFORMATION MANAGEMENT SYSTEM

(71) Applicant: MITSUBISHI ELECTRIC CORPORATION, Tokyo (JP)

(72) Inventors: Jin Kawasaki, Tokyo (JP); Taiki Kobayashi, Tokyo (JP); Tomooki Ukiana, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 645 days.

(21) Appl. No.: 17/027,944

(22) Filed: Sep. 22, 2020

(65) Prior Publication Data
US 2021/0006953 A1    Jan. 7, 2021

Related U.S. Application Data

(63) Continuation of application No. PCT/JP2018/022215, filed on Jun. 11, 2018.

(51) Int. Cl.
| | |
|---|---|
| *H04W 4/38* | (2018.01) |
| *H04W 4/33* | (2018.01) |
| *G16Y 40/10* | (2020.01) |
| *G01D 21/00* | (2006.01) |

(52) U.S. Cl.
CPC ............. *H04W 4/38* (2018.02); *G16Y 40/10* (2020.01); *H04W 4/33* (2018.02); *G01D 21/00* (2013.01)

(58) Field of Classification Search
USPC .......................................................... 702/189
See application file for complete search history.

(56) References Cited

U.S. PATENT DOCUMENTS

| | | | |
|---|---|---|---|
| 2007/0239399 A1 | 10/2007 | Sheynblat et al. | |
| 2012/0135757 A1* | 5/2012 | Lee .................. | G01D 21/00 455/456.3 |
| 2012/0266585 A1 | 10/2012 | Sata | |
| 2013/0096831 A1* | 4/2013 | Chan ................. | H04W 4/38 702/1 |

(Continued)

FOREIGN PATENT DOCUMENTS

| | | |
|---|---|---|
| JP | 2008-275345 A | 11/2008 |
| JP | 2012-7941 A | 1/2012 |

(Continued)

OTHER PUBLICATIONS

Australian Examination Report for Australian Application No. 2018427466, dated Nov. 22, 2021.

(Continued)

*Primary Examiner* — Paul D Lee
(74) *Attorney, Agent, or Firm* — Birch, Stewart, Kolasch & Birch, LLP

(57) ABSTRACT

A collection unit (111) collects a plurality of sensor values at a plurality of measurement points from a plurality of sensors provided to the plurality of measurement points, and per measurement point, accumulates environmental information data including a sensor value, in an accumulation unit (180). An interpolation unit (112) finds a sensor value at a virtual point based on one sensor value or more obtained by one sensor or more. A management unit (113) accumulates environmental information data including the sensor value at the virtual point, in the accumulation unit.

5 Claims, 31 Drawing Sheets

(56) References Cited

U.S. PATENT DOCUMENTS

| | | | |
|---|---|---|---|
| 2013/0297276 A1* | 11/2013 | Imai | G01N 27/624 703/12 |
| 2017/0153032 A1 | 6/2017 | Ashgriz et al. | |
| 2018/0082204 A1 | 3/2018 | Iwamasa et al. | |
| 2019/0028215 A1 | 1/2019 | Kitsunezuka | |
| 2021/0174974 A1* | 6/2021 | Mino | G16Y 40/35 |

FOREIGN PATENT DOCUMENTS

| | | |
|---|---|---|
| JP | 2012-180578 A | 9/2012 |
| JP | 2012-213192 A | 11/2012 |
| JP | 2017-194335 A | 10/2017 |
| JP | 2018-49390 A | 3/2018 |
| WO | WO 2011/086678 A1 | 7/2011 |
| WO | WO 2017/130877 A1 | 8/2017 |

OTHER PUBLICATIONS

International Search Report, issued in PCT/JP2018/022215, dated Sep. 11, 2018.

Kawakami et al., "Distributed Sensor Information Management System Based on Semantic Analysis of Sensor Data", Transactions of Information Processing Society of Japan, Feb. 2013, vol. 54, No. 2, pp. 730-739.

Wakamori et al., "Real-time Spatial Interpolation Visualization System for Multi-streaming Sensor Data", Journal of Information Processing Society of Japan, Consumer Device and System, May 2017, vol. 7, No. 2, pp. 76-86.

Australian Office Action for Australian Application No. 2018427466, dated Jul. 27, 2021.

Australian Office Action for Australian Application No. 2018427466, dated Sep. 29, 2021.

Kawakami et al., "Distributed Sensor Information Management Architecture Based on Semantic Analysis of Sensing Data", 2006 International Symposium on Applications and the Internet, IEEE, 2008, pp. 353-356 (5 pages total).

Foreign Office Action of Australia Application No. AU 2018427466 dated Dec. 21, 2020.

Australian Office Action for Australian Application No. 2018427466, dated Dec. 20, 2021.

British Examination Report under Section 18(3) for British Application No. GB2019178.9, dated Feb. 1, 2021.

* cited by examiner

191B: SENSOR INFORMATION LIST

| SENSOR IDENTIFIER | SENSOR COORDINATE VALUE | INFORMATION TYPE | SENSOR TYPE | |
|---|---|---|---|---|
| s1 | (0, 1, 0) | TEMPERATURE | REAL | ← 192 |
| s2 | (1, 2, 0) | TEMPERATURE | REAL | ← 192 |
| s3 | (2, 1, 0) | TEMPERATURE | REAL | ← 192 |
| ... | ... | ... | ... | |

180:ACCUMULATION UNIT

| SENSOR COORDINATE VALUE | INFORMATION TYPE | SENSOR VALUE | TIME STAMP | |
|---|---|---|---|---|
| (0, 1, 0) | TEMPERATURE | 22.0 | 2018-03-05 09:00:00 | ←181 |
| (1, 2, 0) | TEMPERATURE | 23.0 | 2018-03-05 09:00:00 | ←181 |
| (2, 1, 0) | TEMPERATURE | 21.5 | 2018-03-05 09:00:00 | ←181 |
| ... | ... | ... | ... | |

180:ACCUMULATION UNIT

| SENSOR COORDINATE VALUE | INFORMATION TYPE | SENSOR VALUE | TIME STAMP | |
|---|---|---|---|---|
| (0, 1, 0) | TEMPERATURE | 22.0 | 2018-03-05 09:00:00 | ← 181 |
| (1, 2, 0) | TEMPERATURE | 23.0 | 2018-03-05 09:00:00 | ← 181 |
| (2, 1, 0) | TEMPERATURE | 21.5 | 2018-03-05 09:00:00 | ← 181 |
| (1, 1, 0) | TEMPERATURE | 22.2 | 2018-03-05 09:00:00 | ← 182 |
| ... | ... | ... | ... | |

Fig.10

191:SENSOR INFORMATION LIST

| SENSOR IDENTIFIER | SENSOR COORDINATE VALUE | INFORMATION TYPE | SENSOR TYPE | |
|---|---|---|---|---|
| 0 | (0, 0, 0) | TEMPERATURE | VIRTUAL | ←193 |
| 1 | (0, 1, 0) | TEMPERATURE | REAL | ←192 |
| 2 | (0, 2, 0) | TEMPERATURE | VIRTUAL | ←193 |
| 3 | (1, 0, 0) | TEMPERATURE | VIRTUAL | ←193 |
| 4 | (1, 1, 0) | TEMPERATURE | VIRTUAL | ←193 |
| 5 | (1, 2, 0) | TEMPERATURE | REAL | ←192 |
| 6 | (2, 0, 0) | TEMPERATURE | VIRTUAL | ←193 |
| 7 | (2, 1, 0) | TEMPERATURE | REAL | ←192 |
| 8 | (2, 2, 0) | TEMPERATURE | VIRTUAL | ←193 |
| ... | ... | ... | ... | |

Fig.11

180:ACCUMULATION UNIT

| SENSOR COORDINATE VALUE | INFORMATION TYPE | SENSOR VALUE | TIME STAMP | |
|---|---|---|---|---|
| (0, 0, 0) | TEMPERATURE | 22.0 | 2018-03-05 09:00:00 | 182 |
| (0, 1, 0) | TEMPERATURE | 22.0 | 2018-03-05 09:00:00 | 181 |
| (0, 2, 0) | TEMPERATURE | 22.5 | 2018-03-05 09:00:00 | 182 |
| (1, 0, 0) | TEMPERATURE | 22.8 | 2018-03-05 09:00:00 | 182 |
| (1, 1, 0) | TEMPERATURE | 22.0 | 2018-03-05 09:00:00 | 182 |
| (1, 2, 0) | TEMPERATURE | 23.0 | 2018-03-05 09:00:00 | 181 |
| (2, 0, 0) | TEMPERATURE | 21.5 | 2018-03-05 09:00:00 | 182 |
| (2, 1, 0) | TEMPERATURE | 21.5 | 2018-03-05 09:00:00 | 181 |
| (2, 2, 0) | TEMPERATURE | 22.3 | 2018-03-05 09:00:00 | 182 |
| ... | ... | ... | ... | |

Fig.24

191:SENSOR INFORMATION LIST

| SENSOR IDENTIFIER | SENSOR COORDINATE VALUE | INFORMATION TYPE | SENSOR TYPE | LAST-TIME PRESENTATION TIME POINT | |
|---|---|---|---|---|---|
| s1 | (0, 1, 0) | TEMPERATURE | REAL | YYYY-MM-DD hh:mm:ss | ←192 |
| s2 | (1, 2, 0) | TEMPERATURE | REAL | YYYY-MM-DD hh:mm:ss | ←192 |
| s3 | (2, 1, 0) | TEMPERATURE | REAL | YYYY-MM-DD hh:mm:ss | ←192 |
| v1 | (1, 1, 0) | TEMPERATURE | VIRTUAL | YYYY-MM-DD hh:mm:ss | ←193 |
| ... | ... | ... | ... | | |

Fig.27

191A:SENSOR INFORMATION LIST

| SENSOR IDENTIFIER | SENSOR COORDINATE VALUE | INFORMATION TYPE | SENSOR TYPE | ... | ACCURACY INFORMATION | |
|---|---|---|---|---|---|---|
| s1 | (0, 1, 0) | TEMPERATURE | REAL | ... | ±20% | ← 192 |
| s2 | (1, 2, 0) | TEMPERATURE | REAL | ... | ±20% | ← 192 |
| s3 | (2, 1, 0) | TEMPERATURE | REAL | ... | ±20% | ← 192 |
| v1 | (1, 1, 0) | TEMPERATURE | VIRTUAL | ... | ±20% | ← 193 |
| ... | ... | ... | ... | ... | ... | |

Fig.29

191A:SENSOR INFORMATION LIST

| SENSOR IDENTIFIER | SENSOR COORDINATE VALUE | INFORMATION TYPE | SENSOR TYPE | ... | REFERENCE COORDINATE VALUE | STATUS FLAG | |
|---|---|---|---|---|---|---|---|
| s1 | (0, 1, 0) | TEMPERATURE | REAL | ... | | | ←192 |
| s2 | (1, 2, 0) | TEMPERATURE | REAL | ... | | | ←192 |
| s3 | (2, 1, 0) | TEMPERATURE | REAL | ... | | | ←192 |
| v1 | (1, 1, 0) | TEMPERATURE | VIRTUAL | ... | (0, 1, 0) (1, 2, 0) (2, 1, 0) | VALID | ←193 |
| ... | ... | ... | ... | ... | | | |

ENVIRONMENTAL INFORMATION MANAGEMENT SYSTEM

CROSS REFERENCE TO RELATED APPLICATIONS

This application is a Continuation of PCT International Application No. PCT/JP2018/022215, filed on Jun. 11, 2018, which is hereby expressly incorporated by reference into the present application.

TECHNICAL FIELD

The present invention relates to a technique for managing environmental information.

BACKGROUND ART

In Zero Energy Building (ZEB), it is required to save energy while maintaining a quality of indoor environment. In order to achieve both energy conservation and the quality of indoor environment, it is necessary to grasp the indoor environment in detail and perform maximum energy conservation within a range that does not impair the comfort.

Generally, to grasp the indoor environment, a method of measuring the indoor environment with various types of sensors (such as a thermometer and an illuminance meter) is used.

However, if a number of sensors is excessively small for a size of a room, the indoor environment cannot be accurately grasped. If the number of sensors is excessively large, the cost increases. Further, if the sensor becomes a hindrance, convenience in the room is degraded.

To cope with this situation, environmental information at a position where no sensor is arranged is estimated by an interpolation process based on a measurement value of a sensor.

For example, Non-Patent Literature 1 discloses a method in which a temperature at a position where measurement by a thermometer is not performed is interpolated based on a temperature measured by a thermometer, and a thermal environment is graphically displayed.

CITATION LIST

Non-Patent Literature

Non-Patent Literature 1: WAKAMORI et al, "Real-time Spatial Interpolation Visualization System for Multi-streaming sensor Data", Journal of Information Processing Society of JAPAN, Consumer Device and System, Vol. 7, No. 2, p 76-86.

SUMMARY OF INVENTION

Technical Problem

Conventionally, interpolated environmental information is used only for the purpose of visualizing indoor environment graphically so that a building caretaker (observer) can understand the indoor environment intuitively. Therefore, the interpolated environmental information is destroyed after visualization.

An objective of the present invention is to enable utilization of interpolated environmental information for any purpose and at any timing.

Solution to Problem

An environmental information management system according to the present invention includes:
- a collection unit to collect a plurality of sensor values at a plurality of measurement points from a plurality of sensors provided to the plurality of measurement points, and per measurement point, to accumulate environmental information data including a sensor value, in an accumulation unit;
- an interpolation unit to find a sensor value at a virtual point based on one sensor value or more obtained by one sensor or more; and
- a management unit to accumulate environmental information data including the sensor value at the virtual point, in the accumulation unit.

Advantageous Effects of Invention

According to the present invention, it is possible to enable utilization of interpolated environmental information (a sensor value at a virtual point) for any purpose and at any timing.

BRIEF DESCRIPTION OF DRAWINGS

FIG. 10 is a diagram illustrating a sensor information list 191 in Embodiment 2.

FIG. 11 is a diagram illustrating an accumulation unit 180 in Embodiment 2.

FIG. 24 is a diagram illustrating a sensor information list 191 in Embodiment 9.

FIG. 27 is a diagram illustrating a sensor information list 191A in Embodiment 10.

FIG. 29 is a diagram illustrating a sensor information list 191A in Embodiment 11.

DESCRIPTION OF EMBODIMENTS

Figure 1:
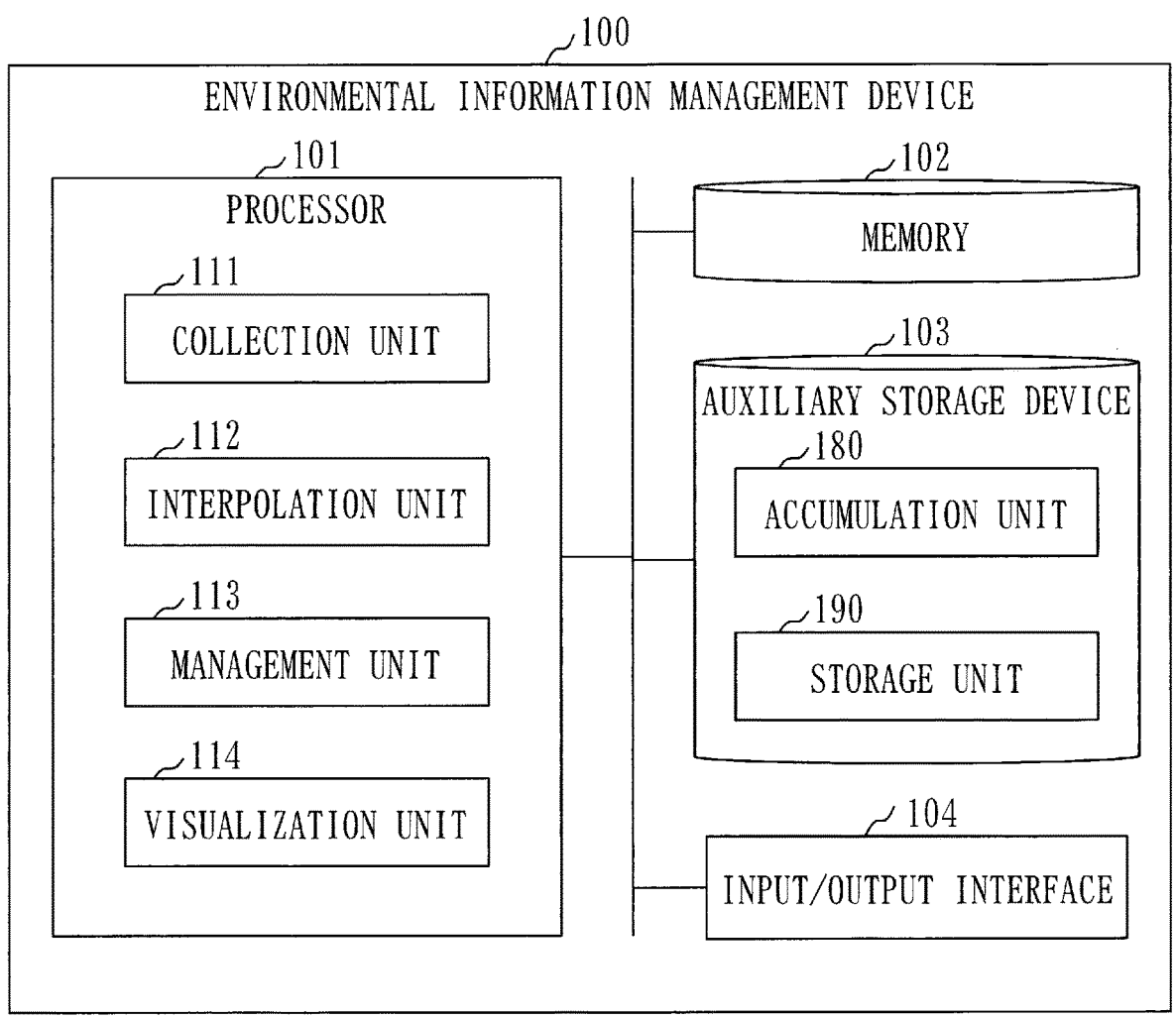
FIG. 1 is a configuration diagram of an environmental information management device 100 in Embodiment 1.

In embodiments and drawings, the same element or equivalent element is denoted by the same reference sign. A description of an element denoted by the same reference sign as that of a described element will be appropriately omitted or simplified. Arrows in the drawings mainly indicate data flows or process flows.

Embodiment 1

A mode in which interpolated environmental information is accumulated will be described with referring to FIGS. 1 to 7.

*Description of Configuration*

A configuration of an environmental information management device 100 will be described with referring to FIG. 1.

The environmental information management device 100 is a computer provided with hardware devices such as a processor 101, a memory 102, an auxiliary storage device 103, and an input/output interface 104. These hardware devices are connected to each other via signal lines.

The processor 101 is an Integrated Circuit (IC) for performing computation processing, and controls the other hardware devices. For example, the processor 101 is a Central Processing Unit (CPU), a Digital Signal Processor (DSP), or a Graphics Processing Unit (GPU).

The memory 102 is a volatile storage device. The memory 102 is also called a main storage device or a main memory. For example, the memory 102 is a Random-Access Memory (RAM). Data stored in the memory 102 is saved in the auxiliary storage device 103 as necessary.

The auxiliary storage device 103 is a nonvolatile storage device. For example, the auxiliary storage device 103 is a Read-Only Memory (ROM), a Hard Disk Drive (HDD), or a flash memory. Data stored in the auxiliary storage device 103 is loaded in the memory 102 as necessary.

The input/output interface 104 is a port to which an input device, an output device, and a communication device are connected. For example, the input/output interface 104 is a USB terminal, the input device includes a keyboard and a mouse, the output device is a display, and the communication device includes a receiver and a transmitter. Note that USB stands for Universal Serial Bus.

The environmental information management device 100 is provided with elements such as a collection unit 111, an interpolation unit 112, a management unit 113, and a visualization unit 114. These elements are implemented by software.

An environmental information management program to cause the computer to function as the collection unit 111, the interpolation unit 112, the management unit 113, and the visualization unit 114 is stored in the auxiliary storage device 103. The environmental information management program is loaded in the memory 102 and executed by the processor 101.

Furthermore, an Operating System (OS) is stored in the auxiliary storage device 103. At least part of the OS is loaded in the memory 102 and executed by the processor 101.

Namely, the processor 101 executes the environmental information management program while executing the OS.

Data obtained by executing the OS is stored in a storage device such as the memory 102, the auxiliary storage device 103, a register in the processor 101, and a cache memory in the processor 101.

The auxiliary storage device 103 functions as an accumulation unit 180 and a storage unit 190. However, another storage device may function as the accumulation unit 180 and the storage unit 190 in place of the auxiliary storage device 103 or along with the auxiliary storage device 103.

The environmental information management device 100 may be provided with a plurality of processors that substitute for the processor 101. The plurality of processors share a role of the processor 101.

The environmental information management program can be computer readably recorded (stored) in a nonvolatile recording medium such as an optical disk and a flash memory.

A configuration of the environmental information management system 200 will be described with referring to FIG. 2.

The environmental information management system 200 is provided with the environmental information management device 100, a plurality of real sensors (s1, s2, s3), and a display 202.

A real sensor is a sensor that actually exists.

If the real sensors are not specified, each real sensor will be referred to as a sensor 201.

The plurality of sensor 201 are arranged in a monitored space 209.

The monitored space 209 is a space as an object of environmental monitoring. For example, the monitored space 209 is an interior of a room in a building.

The sensor 201 measures environmental information such as temperature, illuminance, wind velocity, quantity of carbon dioxide, quantity of solar radiation, and air pressure. A value to be obtained by measurement is called a sensor value.

*Description of Operations*

Operations of the environmental information management device 100 or environmental information management system 200 correspond to an environmental information management method. A procedure of the environmental information management method corresponds to a procedure of the environmental information management program.

An outline of the environmental information management method will be described with referring to FIG. 2.

The plurality of sensors 201 are provided to a plurality of measurement points. That is, each sensor 201 is provided to a corresponding measurement point. The measurement point is a point where a sensor 201 is provided.

The plurality of sensor 201 obtain a plurality of sensor values at the plurality of measurement points by measuring environmental information at the plurality of measurement points. That is, each sensor 201 obtains a sensor value at a measurement point by measuring environmental information at the measurement point. The sensor value is a value obtained by measuring environmental information.

The collection unit 111 collects a plurality of sensor values from the plurality of sensors 201. Per sensor 201, the collection unit 111 generates environmental information data including the collected sensor value. Then, per sensor 201, the collection unit 111 accumulates the generated environmental information data, in the accumulation unit 180.

The interpolation unit 112 finds a sensor value at a virtual point based on one sensor value or more obtained by one sensor 201 or more.

The virtual point is a point where no sensor 201 is provided.

The sensor value at the virtual point is an estimated sensor value obtained by measuring environmental information at the virtual point.

The management unit 113 generates environmental information data including the sensor value at the virtual point, and accumulates the generated environmental information data, in the accumulation unit 180.

The management unit 113 also adds sensor information data of the virtual sensor at the virtual point to a sensor information list containing a plurality of pieces of sensor information data of the plurality of sensors 201.

The sensor information list is stored in the storage unit 190 in advance.

The sensor information data indicates information of a sensor 201 or of a virtual sensor. If whether a sensor 201 or a virtual sensor is not specified, each of the sensor 201 and the virtual sensor is referred to as a sensor hereinafter.

A virtual sensor is a virtual sensor 201 provided at a virtual point.

The visualization unit 114 visualizes environment of the monitored space 209 based on a plurality of pieces of environmental information data (including environmental information data of a virtual point) accumulated in the accumulation unit 180.

The environmental information management method in detail will be described with referring to FIG. 3.

In step S101, the plurality of sensors 201 measure environmental information at a plurality of measurement points, and output a plurality of pieces of measurement data.

The collection unit 111 collects the plurality of pieces of measurement data from the plurality of sensors 201.

The measurement data includes a sensor coordinate value, a sensor value, and a time stamp.

The sensor coordinate value indicates a position of a sensor 201, that is, a position of a measurement point.

The time stamp indicates a time point at which environmental information was measured.

In step S102, the collection unit 111 generates a plurality of pieces of environmental information data based on the plurality of pieces of measurement data.

Then, the collection unit 111 accumulates the plurality of pieces of environmental information data in the accumulation unit 180.

The collection unit 111 generates the environmental information data as follows based on the measurement data.

First, the collection unit 111 extracts the sensor coordinate value, the sensor value, and the time stamp from the measurement data.

Subsequently, the collection unit 111 selects, from the sensor information list, sensor information data including the same sensor coordinate value as the extracted sensor coordinate value.

Subsequently, the collection unit 111 extracts an information type from the selected sensor information data.

Then, the collection unit 111 generates data including the sensor coordinate value, the information type, the sensor value, and the time stamp. The data to be generated is the environmental information data.

The measurement data may include a sensor identifier in place of the sensor coordinate value. In this case, the collection unit 111 extracts the sensor coordinate vale and the information type from sensor information data including the same sensor identifier as the sensor identifier in the measurement data.

Figure 4:
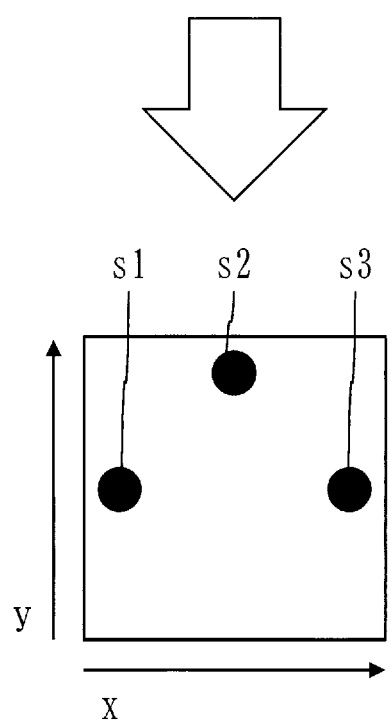
FIG. 4 is a diagram illustrating a sensor information list 191B in Embodiment 1.

A sensor information list 191B will be described with referring to FIG. 4.

The sensor information list 191B is a specific example of the sensor information list in step S102.

The sensor information list 191B contains sensor information data 192 per sensor 201.

The sensor information data 192 includes a sensor identifier, a sensor coordinate value, an information type, and a sensor type. The sensor identifier, the sensor coordinate value, the information type, and the sensor type are associated with each other.

The sensor identifier identifies a sensor 201 or a virtual sensor.

The sensor coordinate value expresses a position of the sensor 201 (that is, a position of a measurement point) or a position of the virtual sensor (that is, a position of a virtual point).

The information type expresses a type of environmental information.

The sensor type differentiates a real sensor and a virtual sensor. A sensor type "real" signifies that a sensor to be identified by the sensor identifier is a real sensor.

A diagram illustrated below the sensor information list 191B is a sensor layout diagram corresponding to the sensor information list 191B. In the sensor layout diagram, a solid circle represents a sensor 201.

Figure 5:
FIG. 5 is a diagram illustrating an accumulation unit 180 in Embodiment 1.

Environmental information data 181 to be accumulated in the accumulation unit 180 will be described with referring to FIG. 5.

The environmental information data 181 is a specific example of the environmental information data to be accumulated in step S102.

The environmental information data 181 includes a sensor coordinate value, an information type, a sensor value, and a time stamp. The sensor coordinate value, the information type, the sensor value, and the time stamp are associated with each other.

Figure 3:
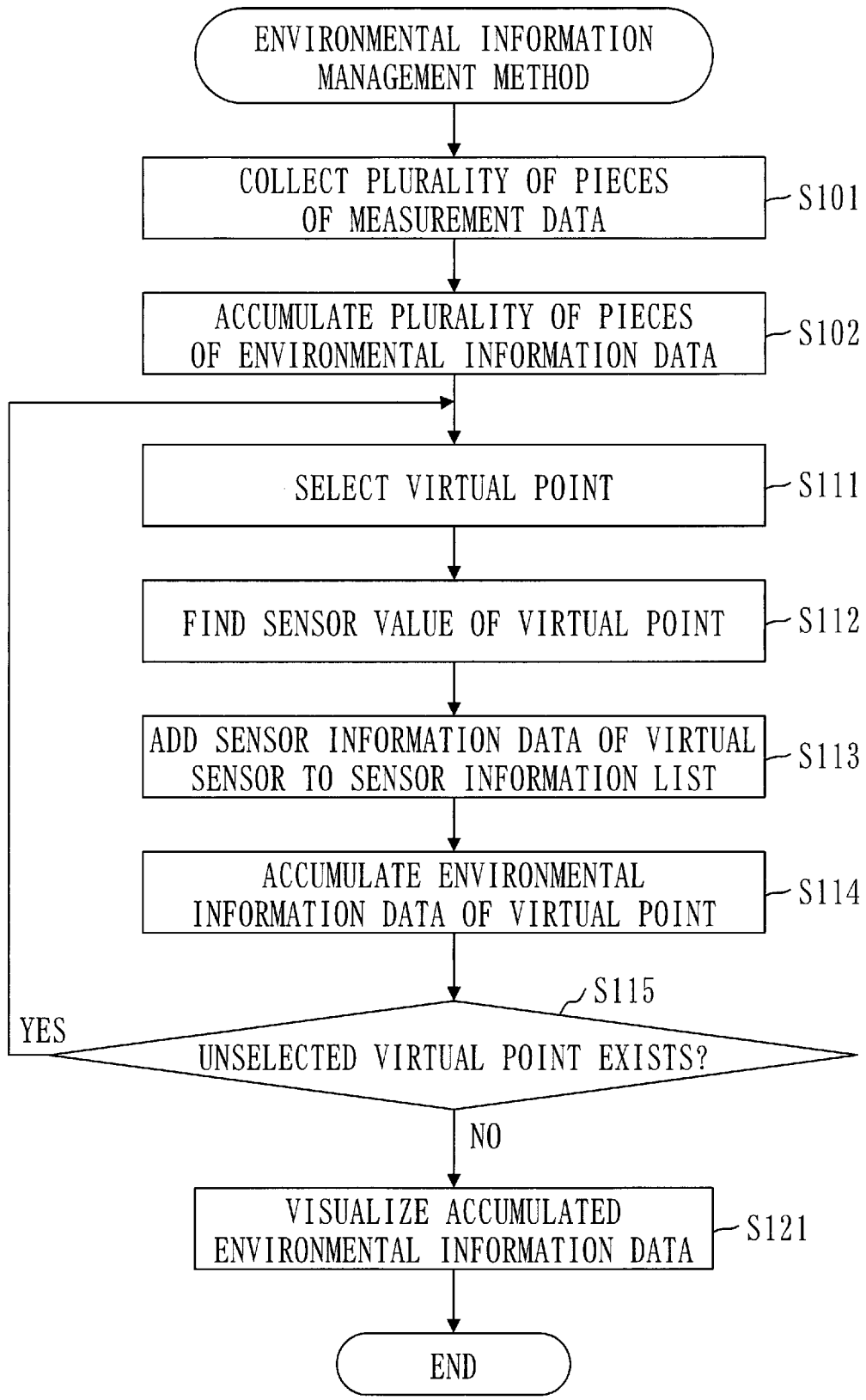
FIG. 3 is a flowchart of an environmental information management method in Embodiment 1.

Getting back to FIG. 3, the description will continue from step S111.

In step S111, one virtual point or more are decided in advance. Specifically, one piece of virtual point data or more are stored in the storage unit 190 in advance.

The virtual point data includes a virtual point coordinate value.

The virtual point coordinate value expresses a position of a virtual point.

The management unit 113 selects one unselected virtual point. Specifically, the management unit 113 selects one piece of unselected virtual point data.

Step S112 to step S114 are carried out for the virtual point selected in step S111.

In step S112, the interpolation unit 112 selects a plurality of suites each consisting of a sensor coordinate value and a sensor value, from the plurality of pieces of environmental information data generated in step S102.

Then, the interpolation unit 112 performs an interpolation process based on the plurality of suites each consisting of a sensor coordinate value and a sensor value, and based on the virtual point coordinate value, to find a sensor value at the virtual point.

For example, the interpolation unit 112 finds the sensor value at the virtual point as follows.

The interpolation unit 112 selects, from the plurality of suites each consisting of a sensor coordinate value and a sensor value, a suite including a sensor coordinate value the closest to the virtual point coordinate value, and extracts a sensor value from the selected suite. The sensor value to be extracted is the sensor value at the virtual point.

If a plurality of suites exist each including the sensor coordinate value the closest to the virtual point coordinate value, the interpolation unit 112 extracts a plurality of sensor values from the plurality of suites, and calculates an average of the extracted plurality of sensor values. The average to be calculated is the sensor value at the virtual point.

In step S113, the management unit 113 generates sensor information data of the virtual sensor, and adds the sensor information data of the virtual sensor to the sensor information list.

For example, the management unit 113 generates the sensor information data of the virtual sensor as follows.

First, the management unit 113 decides a sensor identifier of the virtual sensor.

Subsequently, the management unit 113 extracts an information type from the environmental information data used in step S112.

Then, the management unit 113 generates sensor information data including the sensor identifier of the virtual sensor, including a virtual point coordinate value as the sensor coordinate value, and including the extracted information type and a sensor type "virtual". The sensor information data to be generated is the sensor information data of the virtual sensor.

Figure 6:
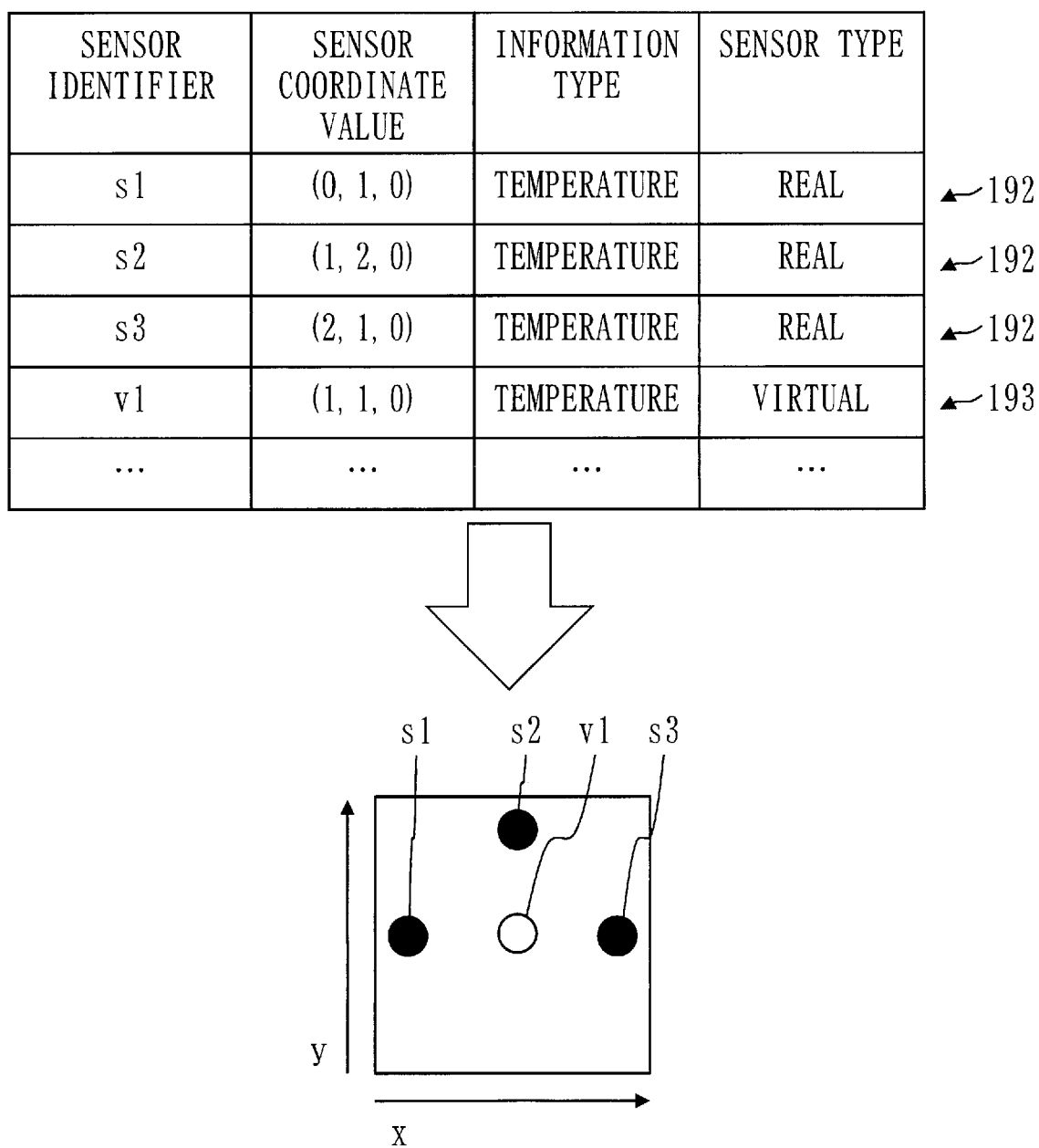
FIG. 6 is a diagram illustrating a sensor information list 191A in Embodiment 1.

A sensor information list 191A will be described with referring to FIG. 6.

The sensor information list 191A is a specific example of the sensor information list after step S113.

The sensor information list 191A contains sensor information data 193.

The sensor information data 193 is the sensor information data of the virtual sensor.

A sensor identifier "v1" of the sensor information data 193 identifies a virtual sensor.

A sensor coordinate value of the sensor information data 193 expresses a virtual point coordinate value (1, 1, 0).

An information type of the sensor information data 193 is the same as an information type of the sensor information data 192.

A sensor type "virtual" of the sensor information data 193 signifies that a sensor identified by the sensor identifier "v1" is a virtual sensor.

A diagram illustrated below the sensor information list 191A is a sensor layout diagram corresponding to the sensor information list 191A. In the sensor layout diagram, a solid circle represents a sensor 201, and a hollow circle represents a virtual sensor.

Getting back to FIG. 3, the description will continue from step S114.

In step S114, the management unit 113 generates environmental information data including a sensor value at a virtual point. The environmental information data to be generated will be referred to as environmental information data of the virtual point.

Then, the interpolation unit 112 accumulates the environmental information data of the virtual point in the accumulation unit 180.

For example, the management unit 113 generates the environmental information data of the virtual point as follows.

First, the management unit 113 extracts an information type and a time stamp from the environmental information data used in step S112.

Then, the management unit 113 generates environmental information data including a virtual point coordinate value as a sensor coordinate value, and including the extracted information type, the sensor value at the virtual point, and the extracted time stamp. The environmental information data to be generated is the environmental information data of the virtual point.

Figure 7:
FIG. 7 is a diagram illustrating the accumulation unit 180 in Embodiment 1.

Environmental information data 182 to be accumulated in the accumulation unit 180 will be described with referring to FIG. 7.

The environmental information data 182 is a specific example of the environmental information data to be accumulated in step S114.

A sensor coordinate value of the environmental information data 182 expresses a virtual point coordinate value (1, 1, 0).

An information type of the environmental information data 182 is the same as the information type of the environmental information data 181.

A sensor value "22.2" of the environmental information data 182 is an average of three sensor values "22.0", "23.0", and "21.5" included in three pieces of environmental information data 181.

A time stamp of the environmental information data 182 is the same as the time stamp of the environmental information data 181.

Getting back to FIG. 3, the description will continue from step S115.

In step S115, the management unit 113 checks whether an unselected virtual point exists. Specifically, the management unit 113 checks whether unselected virtual point data exists.

If an unselected virtual point exists, the processing proceeds to step S111.

If an unselected virtual point does not exist, the processing proceeds to step S121.

In step S121, the visualization unit 114 acquires a plurality of pieces of accumulated environmental information data (including environmental information data of a virtual point) from the accumulation unit 180.

Then, the visualization unit 114 visualizes an environment of the monitored space 209 based on the acquired plurality of pieces of environmental information data. Specifically, the visualization unit 114 generates a graph expressing the environment of the monitored space 209, and displays the generated graph to a display.

Effect of Embodiment 1

According to Embodiment 1, the interpolated environmental information (a sensor value at a virtual point) is accumulated. Therefore, the environmental information can be displayed from the present back to the past retrospectively together with the collected environmental information (a sensor value at a measurement point).

Embodiment 2

A mode in which a plurality of virtual sensors are arranged on a grid will be described with referring to FIGS. 8 to 11, mainly regarding its difference from Embodiment 1.

*Description of Configuration*

A configuration of an environmental information management device 100 is the same as a corresponding configuration in Embodiment 1 (see FIG. 1).

Figure 2:
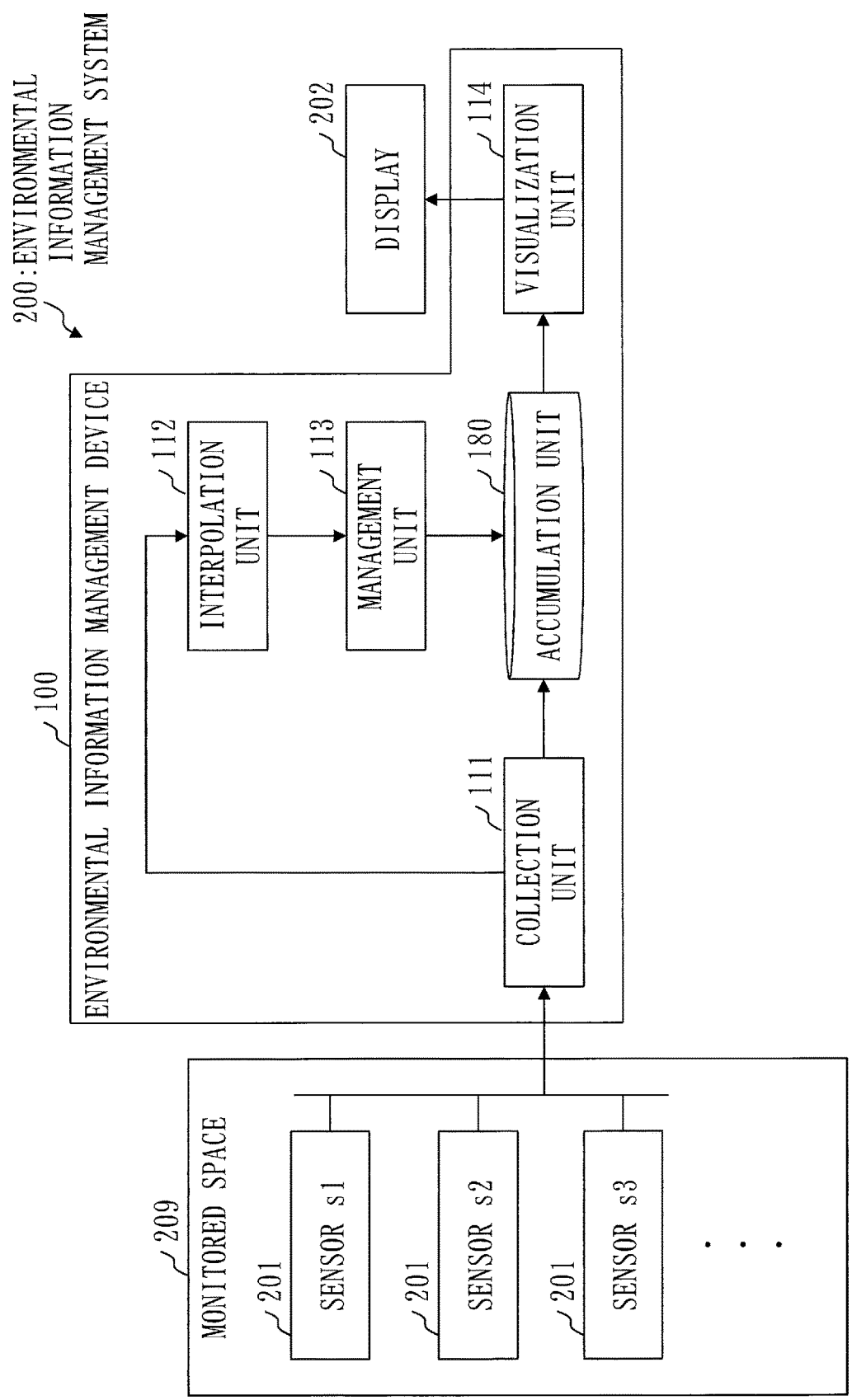
FIG. 2 is a configuration diagram of an environmental information management system 200 in Embodiment 1.

A configuration of an environmental information management system 200 is the same as a corresponding configuration in Embodiment 1 (see FIG. 2).

*Description of Operations*

An outline of an environmental information management method will be described with referring to FIG. 2.

A management unit 113 decides a plurality of virtual points based on a plurality of measurement points, so that the plurality of measurement points and a plurality of virtual points are arranged at a plurality of intersecting points of a grid.

An interpolation unit 112 finds, per virtual point, a sensor value at the virtual point.

The management unit 113 accumulates, per virtual point, environmental information data including the sensor value at the virtual point, in an accumulation unit 180.

Figure 8:
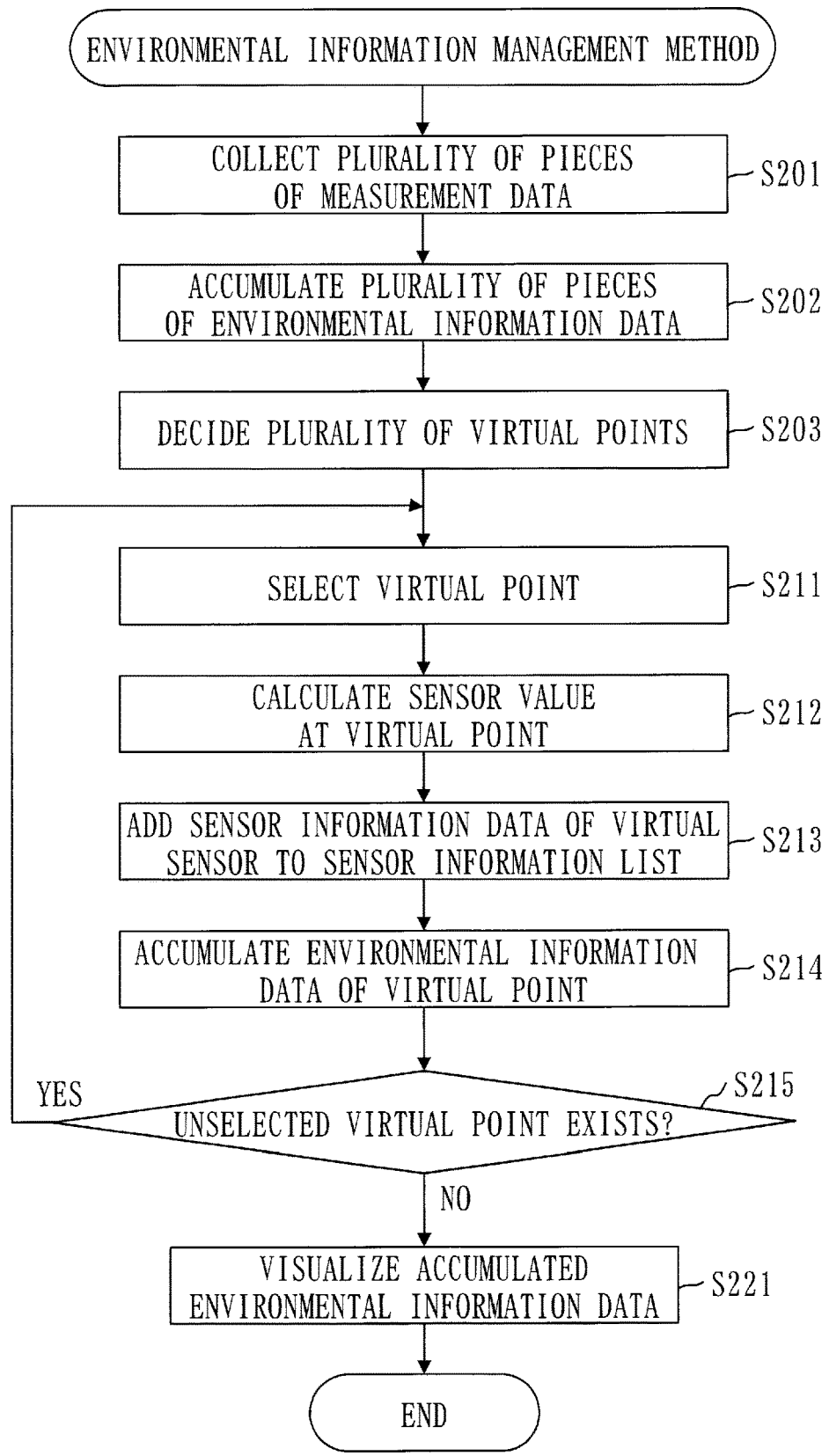
FIG. 8 is a flowchart of an environmental information management method in Embodiment 2.

The environmental information management method in detail will be described with referring to FIG. 8.

In step S201, a collection unit 111 collects a plurality of pieces of measurement data from a plurality of sensors 201.

Step S201 is the same as step S101 in Embodiment 1.

In step S202, the collection unit 111 accumulates a plurality of pieces of environmental information data in the accumulation unit 180 based on the plurality of pieces of measurement data.

Step S202 is the same as step S102 in Embodiment 1.

In step S203, the management unit 113 decides a plurality of virtual points based on a sensor information list.

The management unit 113 decides the plurality of virtual points as follows.

First, the management unit 113 acquires a plurality of sensor coordinate values of the plurality of sensor 201, that is, a plurality of coordinate values of the plurality of measurement points, from the sensor information list.

Then, the management unit 113 calculates a plurality of coordinate values of the plurality of virtual points based on the acquired plurality of sensor coordinate values.

The plurality of measurement points and the plurality of virtual points are arranged on the plurality of intersecting points of the grid.

Figure 9:
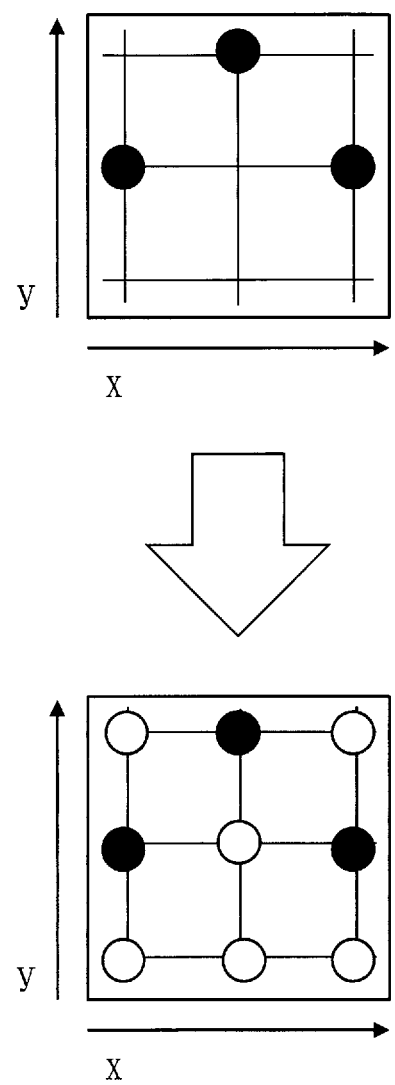
FIG. 9 is a sensor layout diagram in Embodiment 2.

The plurality of virtual points will be described with referring to FIG. 9

A solid circle represents a measurement point. A hollow circle represents a virtual point.

Assume that three measurement points are arranged as illustrated in an upper layout diagram. In this case, six virtual points are decided as illustrated in a lower layout diagram. The three measurement points and the six virtual points are arranged at nine intersecting points of the grid.

Getting back to FIG. 8, step S211 to step S215 and step S221 will be described.

In step S211 to step S215, the interpolation unit 112 calculates, per virtual point, a sensor value at the virtual point, and the management unit 113 accumulates, per virtual point, environmental information data of the virtual point in the accumulation unit 180. Also, the management unit 113 adds, per virtual point, sensor information data of the virtual sensor to the sensor information list.

Step S211 to S215 are the same as step S111 to S115 in Embodiment 1.

In step S221, a visualization unit 114 visualizes an environment of a monitored space 209 based on a plurality of pieces of environmental information data (including the plurality of pieces of environmental information data of the plurality of virtual points) accumulated in the accumulation unit 180.

Step S221 is the same as step S121 in Embodiment 1.

A sensor information list 191 corresponding to the lower layout diagram of FIG. 9 will be described with referring to FIG. 10.

The sensor information list 191 contains three pieces of sensor information data 192 and six pieces of sensor information data 193.

The sensor information data 192 is sensor information data of a sensor 201 and has been registered in the sensor information list 191 in advance.

The sensor information data 193 is sensor information data of a virtual sensor and has been added to the sensor information list 191.

Three sensors 201 and six virtual sensors are arranged at the nine intersecting points of the grid.

The accumulation unit 180 corresponding to the lower layout diagram of FIG. 9 will be described with referring to FIG. 11.

Three pieces of environmental information data 181 and six pieces of environmental information data 182 are accumulated in the accumulation unit 180.

The environmental information data 181 is environmental information data including a sensor value at a measurement point.

The environmental information data 182 is environmental information data including a sensor value at a virtual point.

Effect of Embodiment 2

According to Embodiment 2, environmental information on a predetermined grid (for example, with 1-meter pitch) is interpolated based on a nearby sensor value. That is, a virtual sensor is generated on the grid. As a result, an indoor space can be grasped evenly.

Embodiment 3

Figure 12:
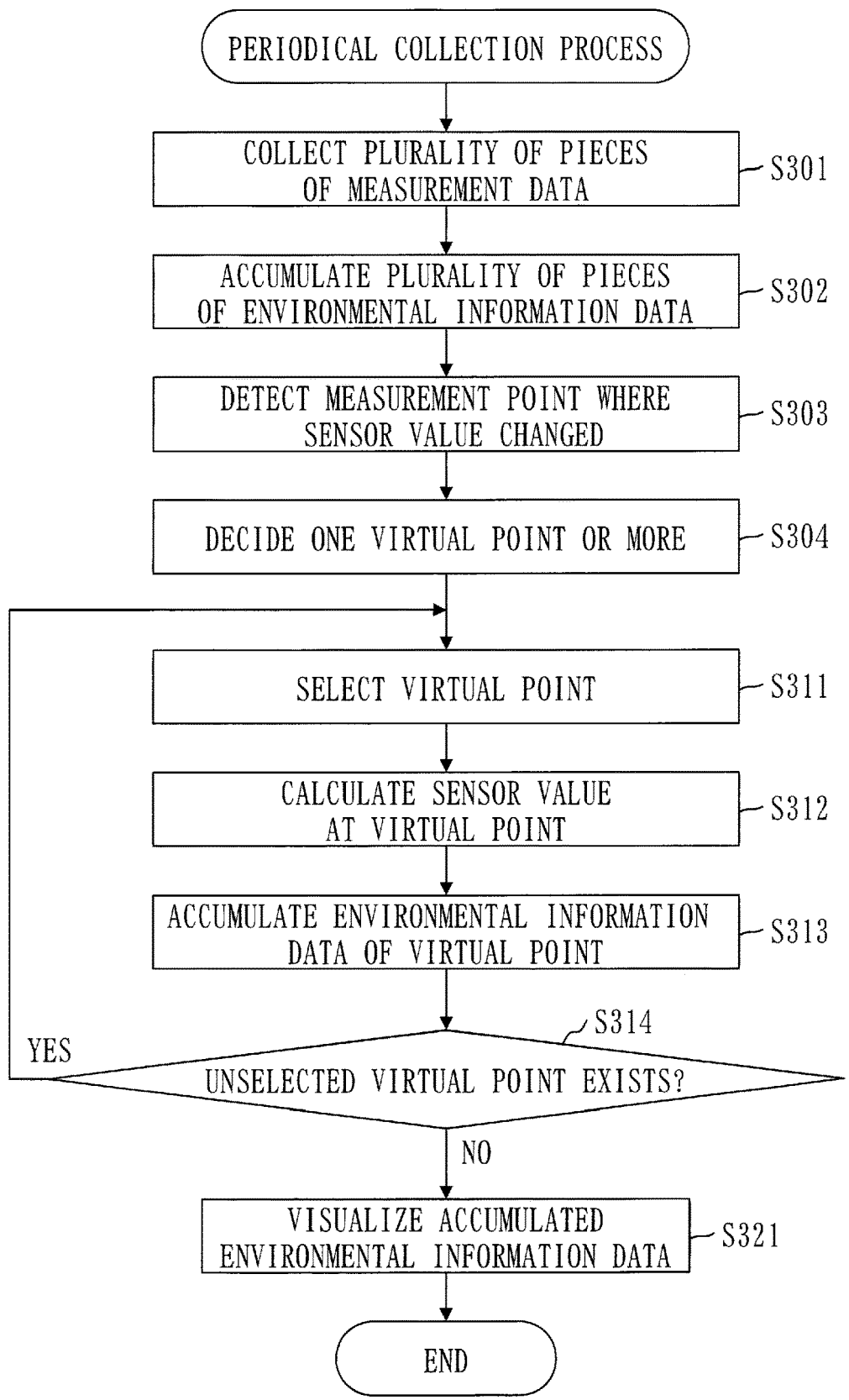
FIG. 12 is a flowchart of a periodical collection process in Embodiment 3.

A mode for enabling accumulation of latest environmental information data will be described with referring to FIG. 12, mainly regarding its differences from Embodiments 1 and 2.

*Description of Configuration*

A configuration of an environmental information management device 100 is the same as a corresponding configuration in Embodiment 1 (see FIG. 1).

* Description of Configuration*

An outline of an environmental information management method will be described with referring to FIG. 2.

A collection unit 111 collects a sensor value at a measurement point periodically. Each time the collection unit 111 collects the sensor value at the measurement point, the collection unit 111 accumulates environmental information data including the sensor value at the measurement point, in an accumulation unit 180.

Each time the sensor value at the measurement point changes, an interpolation unit 112 finds a sensor value at a virtual point.

Each time a sensor value at the virtual point is found, the management unit 113 accumulates environmental information data including the sensor value at the virtual point, in the accumulation unit 180.

A periodical collection process in the environmental information management method will be described with referring to FIG. 12.

The periodical collection process is executed periodically. That is, the periodical collection process is executed each time a predetermined period of time passes.

In step S301, the collection unit 111 collects a plurality of pieces of measurement data from a plurality of sensors 201.

Step S301 is the same as step S101 in Embodiment 1.

In step S302, the collection unit 111 accumulates a plurality of pieces of environmental information data in the accumulation unit 180 based on a plurality of pieces of measurement data.

Step S302 is the same as step S102 in Embodiment 1.

In step S303, a management unit 113 detects a measurement point where the sensor value has changed, based on a plurality of pieces of environmental information data of the last time and a plurality of pieces of environmental information data of this time.

For example, the collection unit 111 detects a measurement point where a difference between a sensor value of the last time and a sensor value of this time is larger than an error threshold.

In step S304, the management unit 113 decides one virtual point or more where the sensor value is to be updated, based on a position of the measurement point where the sensor value has changed.

For example, the management unit 113 selects one virtual point or more adjacent to the measurement point where the sensor value has changed. One virtual point or more to be selected are the one virtual point or more where the sensor value is to be updated.

Step S311 is the same as step S111 in Embodiment 1.
Step S312 is the same as step S112 in Embodiment 1.
Step S313 is the same as step S114 in Embodiment 1.
Step S321 is the same as step S121 in Embodiment 1.

Effect of Embodiment 3

According to Embodiment 3, environmental information is collected from the real sensor periodically. When the environmental information changes, the environmental information of the virtual sensor is updated. Therefore, when utilizing accumulated environmental information by, for example, displaying, the latest environmental information can always be used.

Embodiment 4

A mode in which a sensor value of a virtual point is utilized to find a sensor value of another virtual point will be described, mainly regarding its differences from Embodiments 1 to 3.

\*\*\*Description of Configuration\*\*\*

A configuration of an environmental information management device 100 is the same as a corresponding configuration in Embodiment 1 (see FIG. 1).

\*\*\*Description of Operations\*\*\*

An outline of an environmental information management method will be described with referring to FIG. 2.

An interpolation unit 112 finds a sensor value at another virtual point based on a sensor value at a virtual point.

A management unit 113 accumulates environmental information data including the sensor value at another virtual point, in an accumulation unit 180.

The environmental information management method in detail will be described with referring to FIG. 3.

Steps other than step S112 are as described in Embodiment 1.

In the description of step S112, a virtual point to be selected in step S111 will be referred to as a target point, and a virtual point other than the target point will be referred to as a virtual point.

In step S112, the interpolation unit 112 extracts a suite of a sensor coordinate value and a sensor value from a plurality of pieces of environmental information data of a plurality of measurement points and from one piece of environmental information data or more of one virtual point or more.

Then, the interpolation unit 112 performs an interpolation process based on a plurality of suites each consisting of a sensor coordinate value and a sensor value and based on a target point coordinate value, so as to find a sensor value at a target point.

For example, the interpolation unit 112 selects three points in order of proximity to the target point. A point to be selected may be either a measurement point or a virtual point. Then, the interpolation unit 112 calculates an average of three sensor values at the selected three points. The average to be calculated is the sensor value at the target point.

In step S212 of Embodiment 2 (see FIG. 8) and step S312 of Embodiment 3 (see FIG. 12), the interpolation unit 112 finds a sensor value at each virtual point as in step S112 of Embodiment 4.

Effect of Embodiment 4

According to Embodiment 4, based on not only the environmental information of a real sensor but also on the environmental information of a virtual sensor, another virtual sensor is further generated. Thus, by using the environmental information of the virtual sensor that is more appropriate for the interpolation process than the environmental information of the real sensor, a calculation amount of the interpolation process can be reduced.

Embodiment 5

Figure 14:
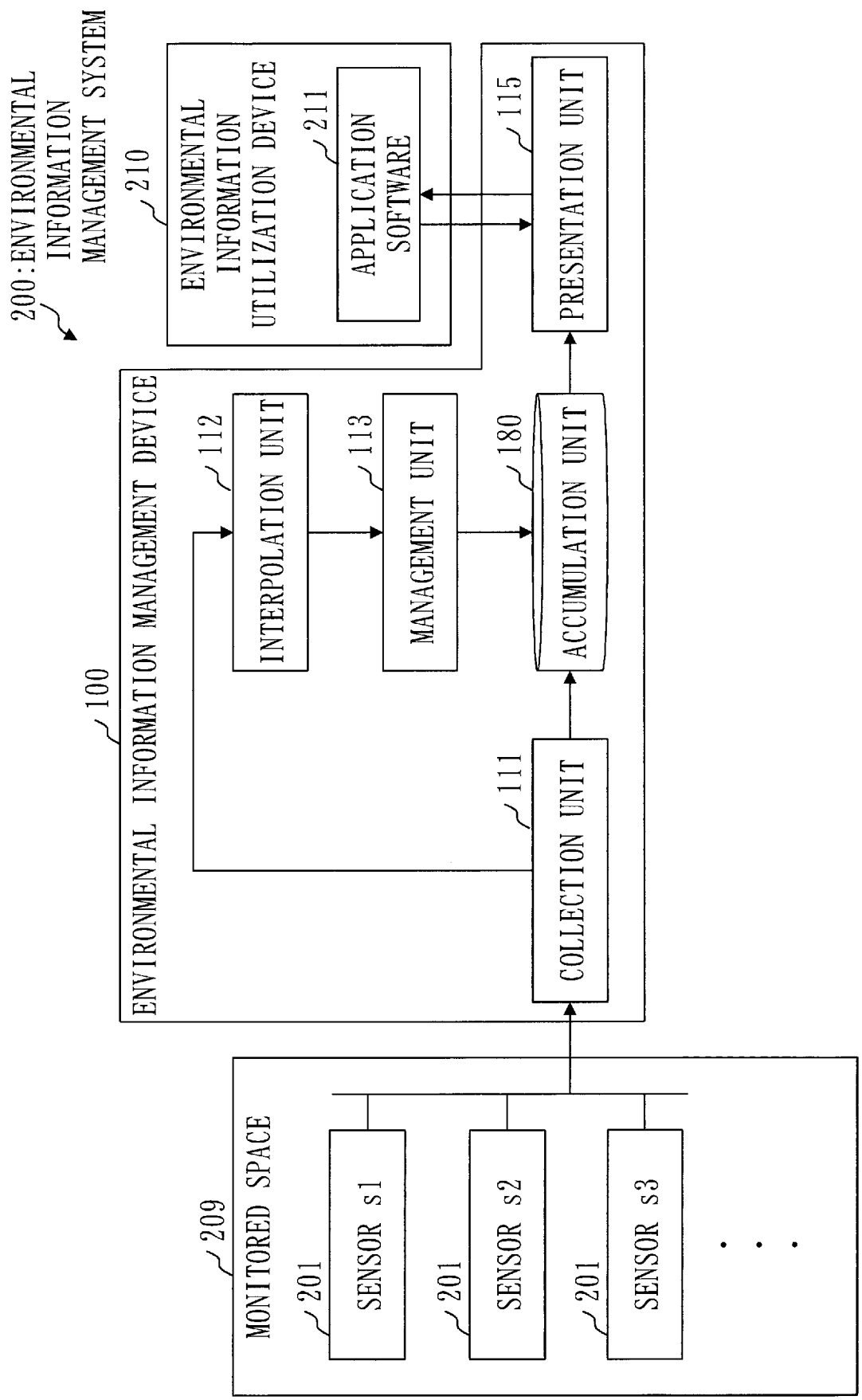
FIG. 14 is a configuration diagram of an environmental information management system 200 in Embodiment 5.
Figure 15:
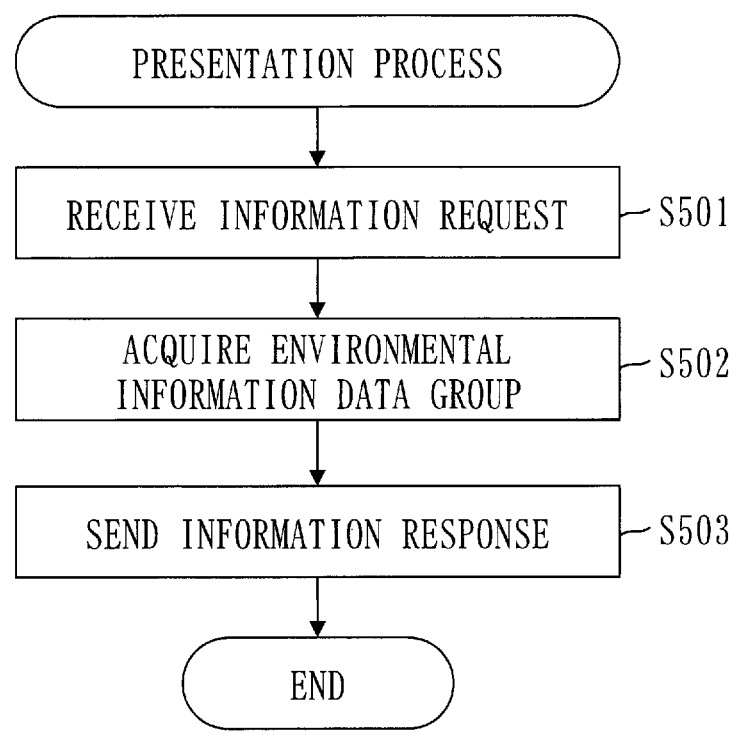
FIG. 15 is a flowchart of a presentation process in Embodiment 5.

A mode for utilizing the accumulated environmental information data for various usages other than visualization will be described with referring to FIGS. 13 to 15, mainly regarding its differences from Embodiments 1 and 2.

\*\*\*Description of Configuration\*\*\*

A configuration of an environmental information management device 100 will be described with referring to FIG. 13.

The environmental information management device 100 is further provided with an element: a presentation unit 115.

The presentation unit 115 is implemented by software.

An environmental information management program causes a computer to further function as the presentation unit 115.

\*\*\*Description of Operations\*\*\*

An outline of an environmental information management method will be described with referring to FIG. 14.

An environmental information management system 200 is further provided with an environmental information utilization device 210.

The environmental information utilization device 210 is a computer that utilizes environmental information data accumulated in an accumulation unit 180.

The environmental information utilization device 210 executes application software 211.

The application software 211 is software that utilizes the environmental information data accumulated in the accumulation unit 180.

The presentation unit 115 accepts an information request requesting one piece of environmental information data or more, acquires the one piece of environmental information data or more from the accumulation unit 180, and responds with the one piece of environmental information data or more.

A presentation process in the environmental information management method will be described with referring to FIG. 15.

The presentation unit 115 has an application programming interface (API) for accepting a request. This API is open to public.

In step S501, an environmental information utilization device 210 executes the application software 211.

The application software 211 utilizes the open API of the presentation unit 115 to thereby send an information request to the presentation unit 115.

The presentation unit 115 receives the information request from the application software 211 via the open API.

The information request is data for requesting an environmental information data group and includes a search condition. The environmental information data group consists of one piece of environmental information data or more and is designated by the search condition. Specifically, the search condition is defined by a time range or a coordinate range, or a combination of a time range and a coordinate range.

In step S502, the presentation unit 115 searches the accumulation unit 180 to find an environmental information data group that matches with the search condition.

Then, the presentation unit 115 acquires the environmental information data group that matches with the search condition, from the accumulation unit 180.

For example, if a sensor coordinate value is designated in the search condition, the presentation unit 115 acquires an environmental information data group including the same sensor coordinate value as the designated sensor coordinate value, from the accumulation unit 180.

In step S503, the presentation unit 115 sends an information response to the application software 211.

The information response is data for sending a search information data group as a response, and includes an environmental information data group that matches with the search condition.

The application software 211 receives the information response and extracts the environmental information data group from the information response.

Then, the application software 211 performs information processing using the environmental information data group.

For example, the environmental information data group is used in information processing as follows.

An environmental change of a monitored space 209 is simulated to predict a future environment of a monitored space 209.

A past environment of the monitored space 209 is analyzed to detect a factor that interferes with energy saving.

Effect of Embodiment 5

According to Embodiment 5, accumulated environmental information can be outputted in response to a request from the application software. Thus, the accumulated environmental information can be utilized in various usages other than visualization.

Embodiment 6

A mode in which presentation of environmental information data of a designated point is enabled will be described with referring to FIGS. 16 and 17, mainly regarding its difference from Embodiment 5.

\*\*\*Description of Configuration\*\*\*

Figure 13:
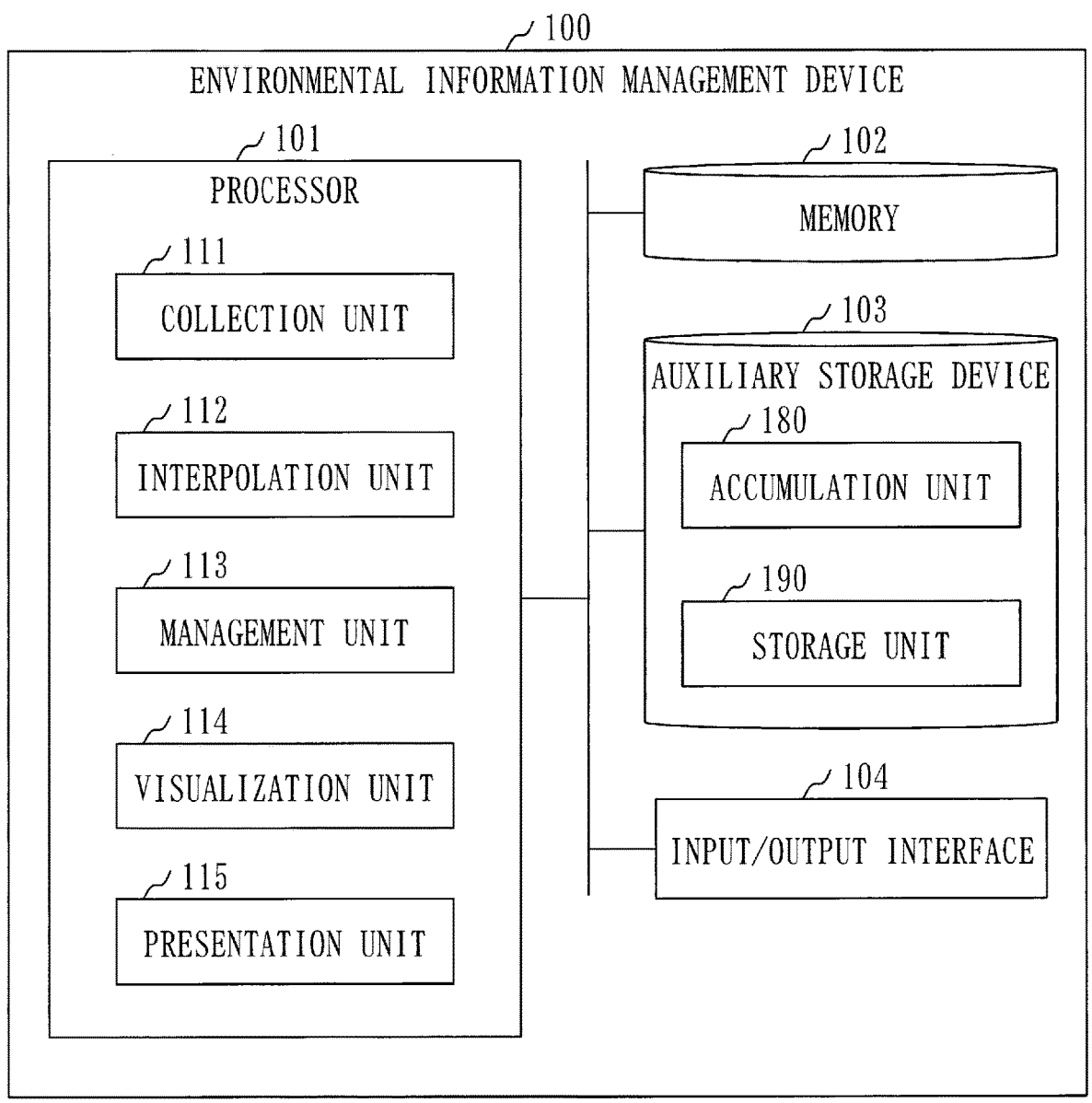
FIG. 13 is a configuration diagram of an environmental information management device 100 in Embodiment 5.

A configuration of an environmental information management device 100 is the same as a corresponding configuration in Embodiment 5 (see FIG. 13).

\*\*\*Description of Operations\*\*\*

An outline of an environmental information management method will be described with referring to FIG. 16.

A presentation unit 115 accepts an information request indicating a designated point. The designated point is a point that is designated.

When environmental information data including a sensor value at the designated point is not accumulated in an accumulation unit 180, an interpolation unit 112 finds a sensor value at the designated point based on one piece of environmental information data or more accumulated in the accumulation unit 180.

A management unit 113 accumulates environmental information data including a sensor value at the designated point, in the accumulation unit 180.

The presentation unit 115 responds with environmental information data including a sensor value at the designated point.

A presentation process in the environmental information management method will be described with referring to FIG. 17.

In step S601, the presentation unit 115 receives an information request from application software 211.

The information request includes a search condition in which a designated coordinate value is designated. The designated coordinate value is a coordinate value of the designated point.

In step S602, the presentation unit 115 searches the accumulation unit 180 to find environmental information data that matches with the search condition.

The environmental information data that matches with the search condition is environmental information data including a sensor coordinate value that is the same as the designated coordinate value. That is, the environmental information data that matches with the search condition is the environmental information data of the designated point.

The environmental information data that matches with the search condition is called matching data in step S602.

If matching data is found, the processing proceeds to step S621.

If matching data is not found, the processing proceeds to step S611.

In step S611, the interpolation unit 112 acquires, from the accumulation unit 180, one piece of environmental information data or more of one measurement point or more located around the designated point.

Then, the interpolation unit 112 finds a sensor value at the designated point based on the acquired one piece of environmental information data or more. A method of finding the sensor value at the designated point is the same as a method of finding a sensor value at a virtual point.

In step S612, the management unit 113 generates sensor information data of a virtual sensor at the designated point. A method of generating the sensor information data of the virtual sensor at the designated point is the same as a method of generating sensor information data of a virtual sensor at a virtual point.

Then, the management unit 113 adds the sensor information data of the virtual sensor at the designated point to a sensor information list 191.

In step S613, the management unit 113 generates environmental information data including a sensor value at the designated point. The environmental information data to be generated is called environmental information data of the designated point.

Then, the management unit 113 accumulates the environmental information data of the designated point in the accumulation unit 180.

A method of generating the environmental information data of the designated point is the same as a method of generating environmental information data of a virtual point.

In step S621, the presentation unit 115 acquires an environmental information data group of the designated point from the accumulation unit 180.

In step S622, the presentation unit 115 sends an information response including the environmental information data group of the designated point to application software 211.

Effect of Embodiment 6

According to Embodiment 6, a request from the application software is accepted, and after that environmental information of a designated position is found. That is, environmental information of a position other than an intersecting point on a predetermined grid can be obtained. Therefore, the environment can be grasped in more detail. Since unnecessary virtual sensor not requested by the application software is not generated, the capacity of the accumulation unit 180 can be economized.

Embodiment 7

Figure 18:
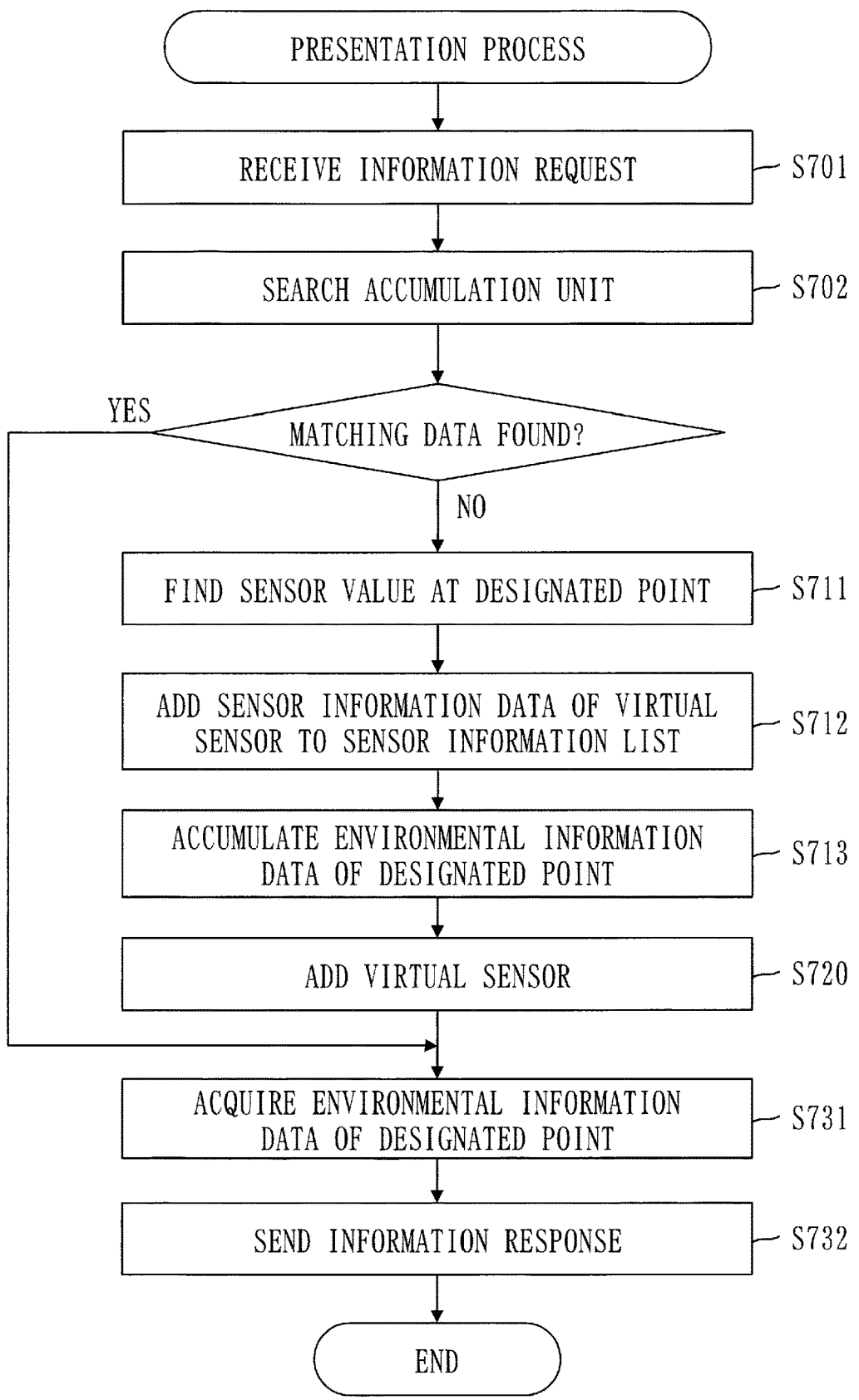
FIG. 18 is a flowchart of a presentation process in Embodiment 7.
Figure 19:
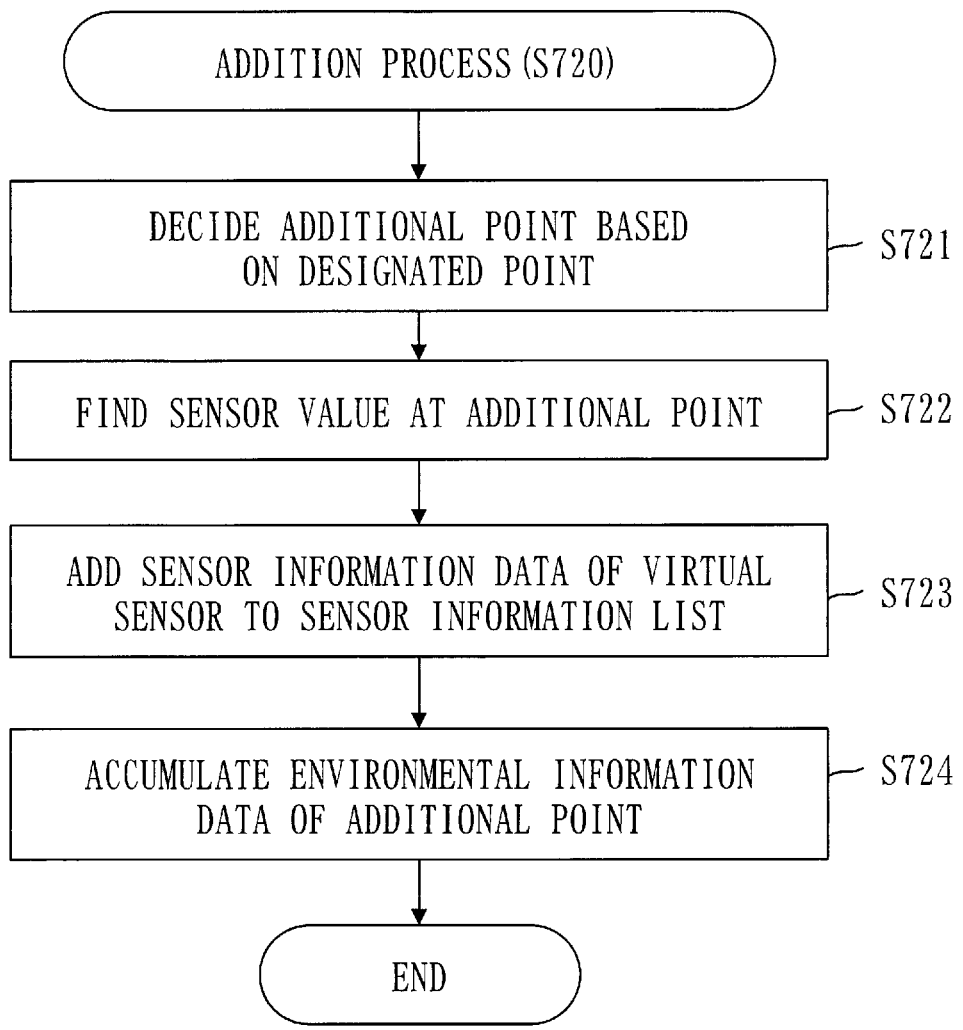
FIG. 19 is a flowchart of an addition process (S720) in Embodiment 7.

A mode in which an undesignated virtual sensor is provided in advance in the vicinity of a designated new virtual sensor will be described with referring to FIGS. 18 and 19, mainly regarding its difference from Embodiment 6.

*Description of Configuration*

A configuration of an environmental information management device 100 is the same as a corresponding configuration in Embodiment 6 (see FIG. 13).

Figure 16:
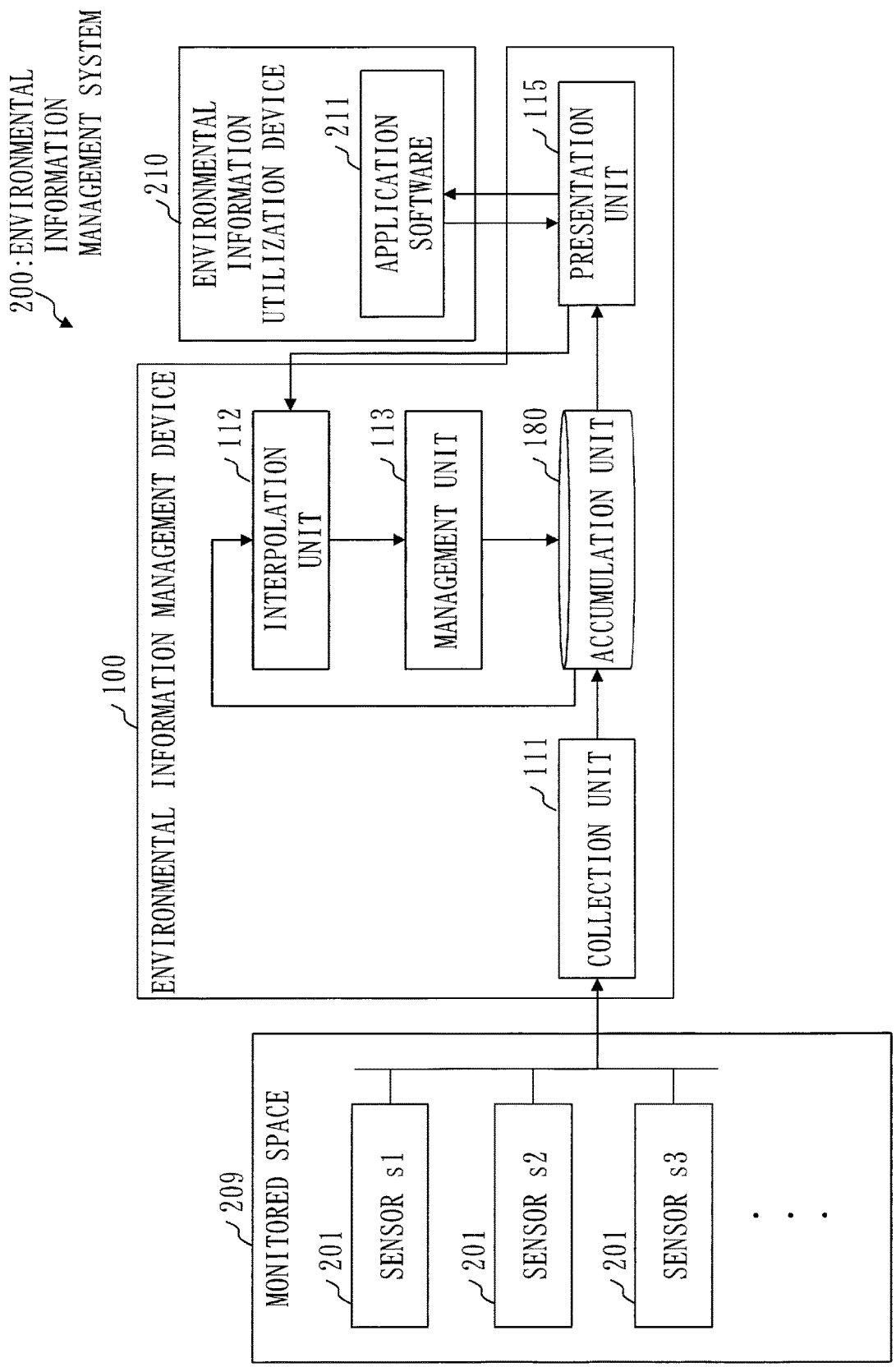
FIG. 16 is a configuration diagram of an environmental information management system 200 in Embodiment 6.
Figure 17:
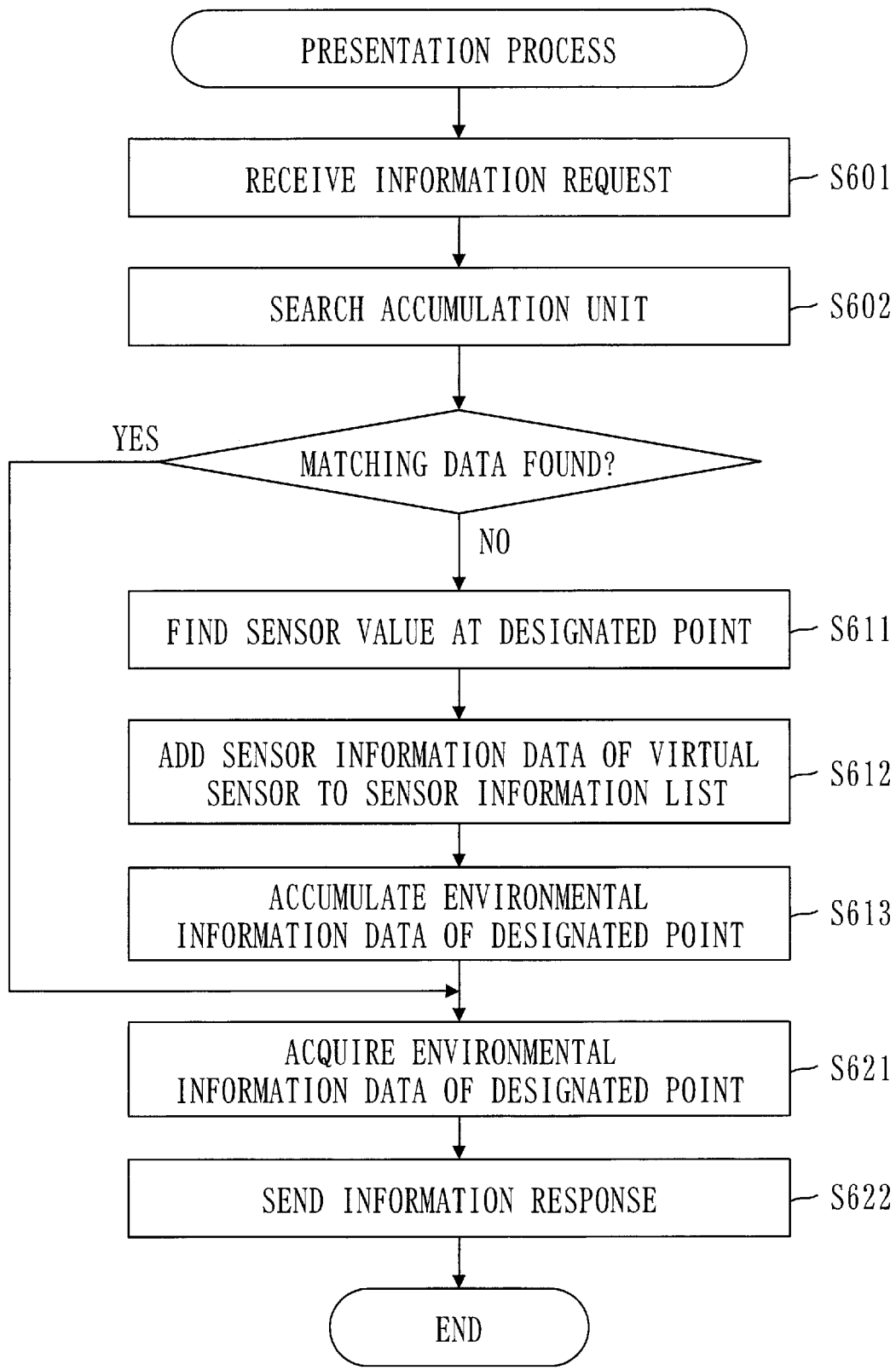
FIG. 17 is a flowchart of a presentation process in Embodiment 6.

A configuration of an environmental information management system 200 is the same as a corresponding configuration in Embodiment 6 (see FIG. 16).

*Description of Operations*

An outline of an environmental information management method will be described.

When environmental information data including a sensor value at a designated point is not accumulated in an accumulation unit 180, a management unit 113 decides an additional point based on the designated point. The additional point is a new virtual point different from the designated point.

An interpolation unit 112 finds a sensor value at the additional point based on one piece of environmental information data or more accumulated in the accumulation unit 180.

The management unit 113 accumulates environmental information data including the sensor value at the additional point, in the accumulation unit 180.

The management unit 113 adds sensor information data of a virtual sensor at the additional point to a sensor information list 191.

A presentation process in the environmental information management method will be described with referring to FIG. 18.

Step S701 to step S713 are the same as step S601 to step S613, respectively, in Embodiment 6.

In step S720, the environmental information management device 100 adds a virtual sensor.

An addition process (S720) in detail will be described later.

Step S731 and step S732 are the same as step S621 and step S622, respectively, in Embodiment 6.

The addition process (S720) will be described with referring to FIG. 19.

In step S721, the management unit 113 decides the additional point based on the designated point.

For example, the management unit 113 decides a point deviating from the designated point by a specific variation amount (direction and distance), as the additional point.

For example, the management unit 113 predicts a designated point of the next time based on a plurality of past designated points, and decides the predicted designated point of the next time as the additional point. Specifically, the management unit 113 calculates a variation amount (direction and distance) of the designated point based on the plurality of past designated points, and decides a point (the designated point of the next time) deviating from the designated point of this time by the calculated variation amount, as the additional point.

In step S722, the interpolation unit 112 finds a sensor value at the additional point based one piece of environmental information data or more accumulated in the accumulation unit 180.

A method of finding the sensor value at the additional point is the same as a method of finding a sensor value at the designated point.

In step S723, the management unit 113 adds sensor information data of a virtual sensor at the additional point to a sensor information list 191.

A method of adding the sensor information data of the virtual sensor at the additional point is the same as a method of adding sensor information data of the virtual sensor at the designated point.

In step S724, the management unit 113 accumulates the environmental information data of the additional point in an accumulation unit 180.

A method of accumulating the environmental information data of the additional point is the same as a method of accumulating environmental information data of the designated point.

Effect of Embodiment 7

According to Embodiment 7, when environmental information of a new virtual sensor is requested, another virtual sensor is generated in the vicinity of the new virtual sensor. That is, environmental information after interpolation, which is expected to be used very soon, is generated in advance. Therefore, a response speed of the environmental information is increased.

Embodiment 8

A mode in which presentation of latest environmental information data is enabled will be described with referring to FIGS. 20 to 22, mainly regarding its differences from Embodiments 6 and 7.

\*\*\*Description of Configuration\*\*\*

A configuration of an environmental information management device 100 is the same as a corresponding configuration in Embodiment 5 (see FIG. 13).

\*\*\*Description of Operations\*\*\*

An outline of an environmental information management method will be described.

When environmental information data including a sensor value at a designated point is not accumulated in an accumulation unit 180, an interpolation unit 112 acquires one piece of environmental information data or more from the accumulation unit 180. Based on the time stamp of each of the acquired one piece of environmental information data or more, the interpolation unit 112 detects environmental information data that has passed a valid reference time, among the acquired one piece of environmental information data or more. The valid reference time is predetermined time duration.

A collection unit 111 collects a new sensor value from a sensor corresponding to the environmental information data that has passed the valid reference time, and accumulates new environmental information data including the new sensor value, in the accumulation unit 180.

The interpolation unit 112 finds a sensor value at the designated point based on the new environmental information data in place of the environmental information data that has passed the valid reference time.

A presentation process in an environmental information management method will be described with referring to FIGS. 20 and 21.

In step S801 (see FIG. 20), a presentation unit 115 receives an information request from application software 211.

In step S802, the presentation unit 115 searches the accumulation unit 180 to find environmental information data that matches with a search condition.

Step S801 and step S802 are the same as step S601 and step S602, respectively, in Embodiment 6.

The environmental information data that matches the search condition is environmental information data of the designated point. The environmental information data that matches with the search condition is called matching data in step S802.

Figure 21:
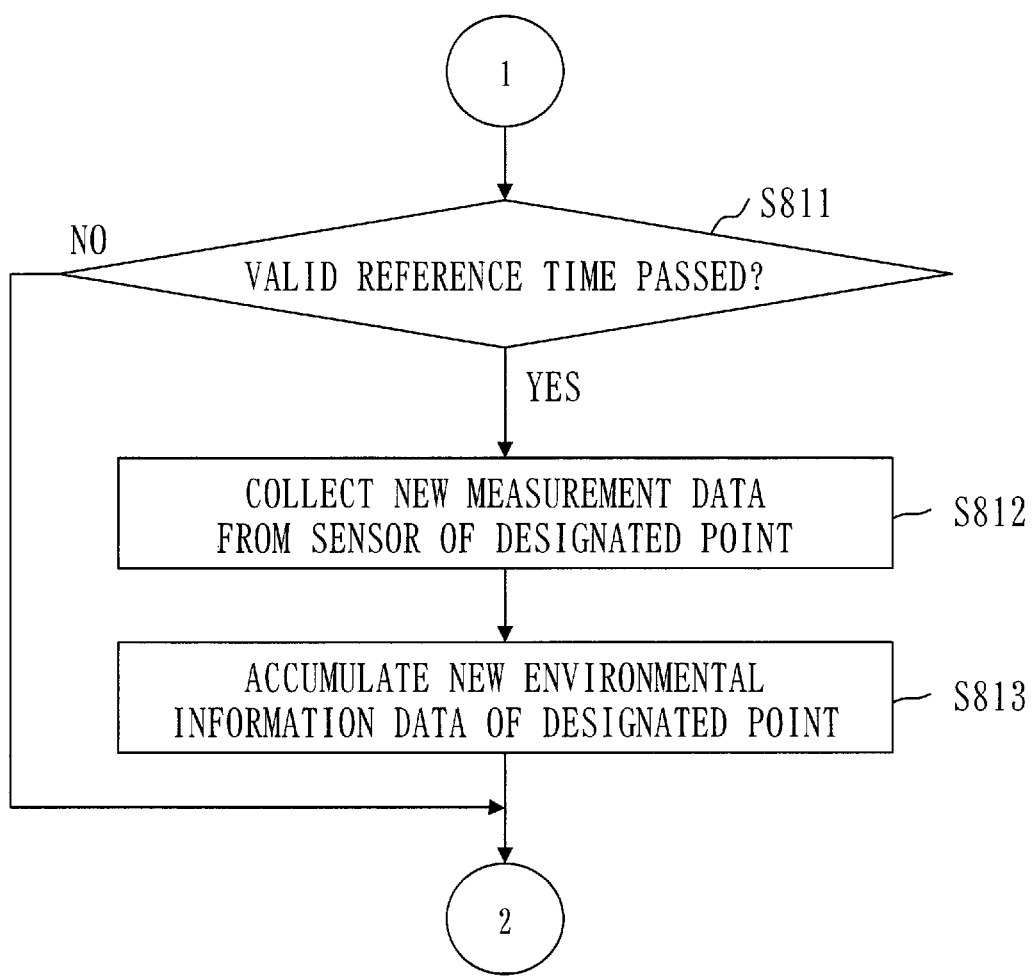
FIG. 21 is a flowchart of the presentation process in Embodiment 8.
Figure 22:
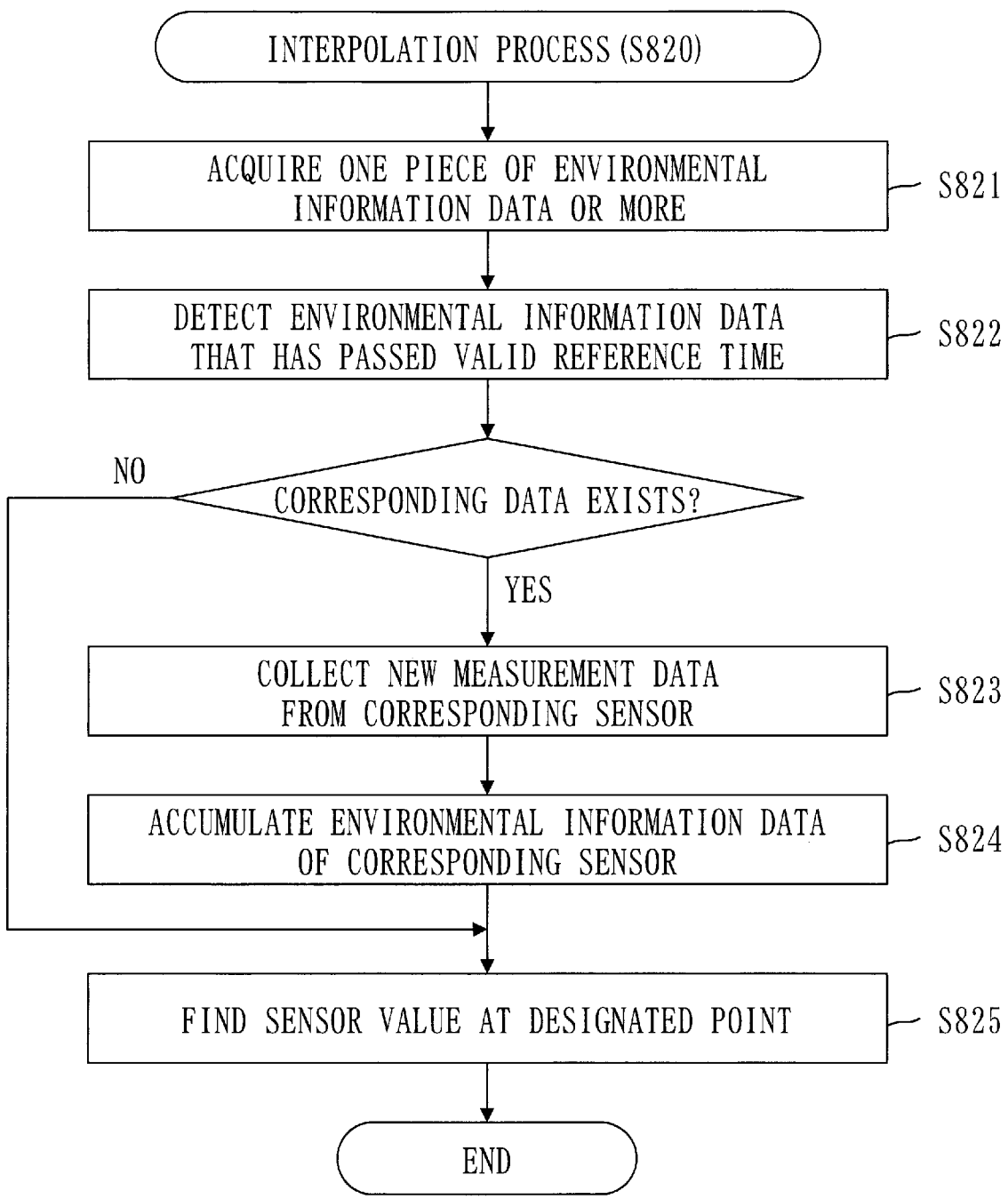
FIG. 22 is a flowchart of an interpolation process (S820) in Embodiment 8.

If matching data is found, the processing proceeds to step S811 (see FIG. 21).

If matching data is not found, the processing proceeds to step S820.

In step S811 (see FIG. 21), the presentation unit 115 checks whether a valid reference time of the environmental information data of the designated point has passed, based on a time stamp included in the environmental information data of the designated point.

When a time since a time point indicated by the time stamp of the environmental information data until a present time point is longer than the valid reference time, the valid reference time of the environmental information data has passed.

If the valid reference time of the environmental information data of the designated point has passed, the processing proceeds to step S812.

If the valid reference time of the environmental information data of the designated point has not passed, the processing proceeds to step S841.

In step S812, the collection unit 111 collects new measurement data from a sensor 201 at the designated point.

In step S813, the collection unit 111 generates new environmental information data of the designated point based on the new measurement data. A method of generating the new environmental information data of the designated point is the same as a method of generating environmental information data of a measurement point.

Figure 20:
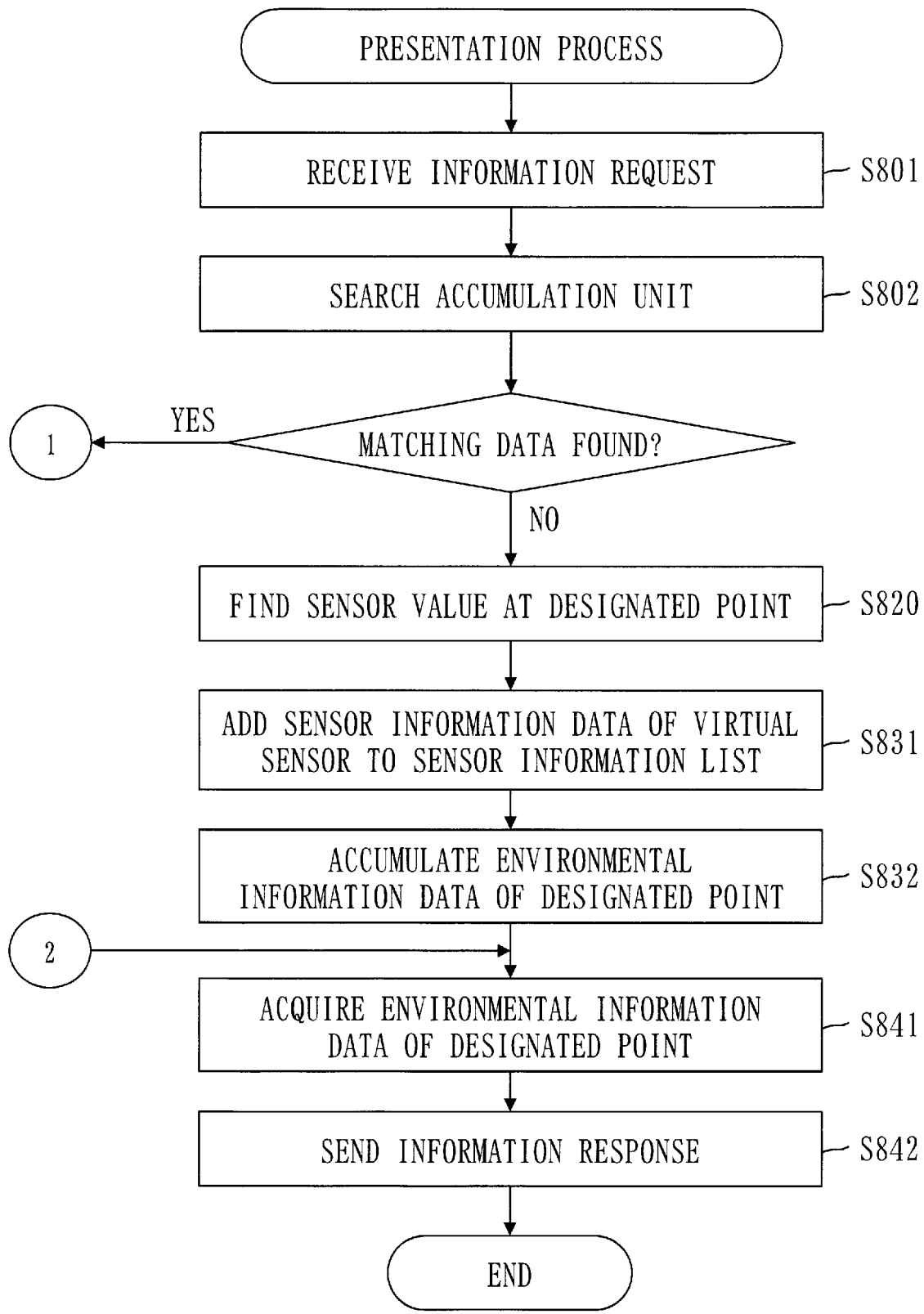
FIG. 20 is a flowchart of a presentation process in Embodiment 8.

Then, the collection unit 111 accumulates the new environmental information data of the designated point in the accumulation unit 180, After step S813, the processing proceeds to step S841 (see FIG. 20).

Getting back to FIG. 20, step S820 will be described.

In step S820, the interpolation unit 112 finds a sensor value at the designated point.

An interpolation process (S720) will be described with referring to FIG. 22.

In step S821, the interpolation unit 112 acquires one piece of environmental information data or more of one measurement point or more located around the designated point, from the accumulation unit 180.

In step S822, the interpolation unit 112 detects environmental information data that has passed a valid reference time, among the acquired one piece of environmental information data or more, based on time stamps of the acquired one piece of environmental information data or more.

When a time since a time point indicated by a time stamp of the environmental information data until a present time point is longer than the valid reference time, the valid reference time of the environmental information data has passed.

Among the acquired one piece of environmental information data or more, environmental information data that has passed a valid reference time will be called corresponding data in step S822.

If corresponding data exists, the processing proceeds to step S823.

If corresponding data does not exists, the processing proceeds to step S825.

In step S823, the collection unit 111 acquires new measurement data from the corresponding sensor.

The corresponding sensor is a sensor 201 of a measurement point corresponding to the environmental information data that has passed the valid reference time.

In step S824, the collection unit 111 generates new environmental information data based on the new measurement data. A method of generating the new environmental information data is the same as a method of generating the environmental information data of the measurement point.

Then, the collection unit 111 accumulates the new environmental information data in the accumulation unit 180.

In step S825, the interpolation unit 112 finds a sensor value at the designated point based on the one piece of environmental information data or more (excluding the environmental information data that has passed the valid reference time) acquired in step S821 and the new environmental information data generated in step S824.

A method of finding a sensor value at the designated point is the same as a method of finding a sensor value at a virtual point.

Getting back to FIG. 20, step S831 and beyond will be described.

Step S831 is the same as step S612 in Embodiment 6.

Step S832 is the same as step S613 in Embodiment 6.
Step S841 is the same as step S621 in Embodiment 6.
Step S842 is the same as step S622 in Embodiment 6.

Effect of Embodiment 8

According to Embodiment 8, new environmental information to replace environmental information that has passed a certain period of time or more is obtained. Therefore, it is possible to always respond to a request of application software with the latest environmental information.
\*\*\*Other Configurations\*\*\*
In Embodiment 8, a virtual sensor at an additional point may be provided as in Embodiment 7.
In a case where a valid reference time has passed for environmental information data which is referred to for obtaining a sensor value at an additional point, the processing is the same as processing of a case where a valid reference time has passed for environmental information data which is referred to for obtaining a sensor value at a designated point. In other words, the interpolation unit 112 finds a sensor value at the additional point based on new environmental information data.

Embodiment 9

Figure 23:
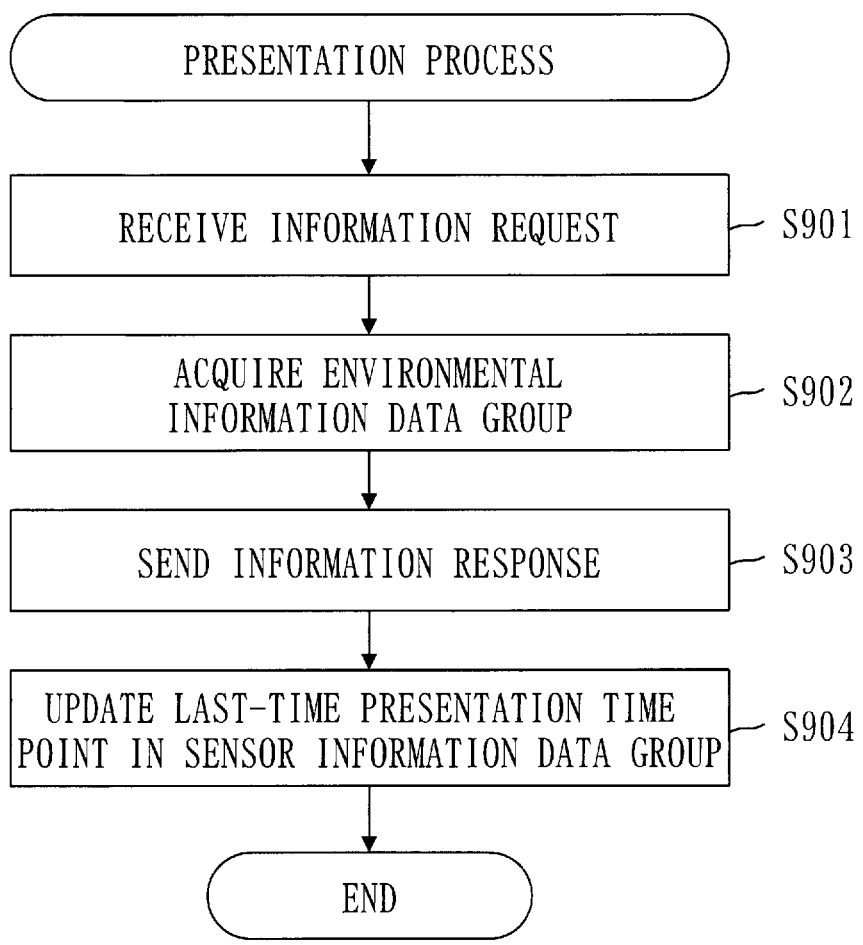
FIG. 23 is a flowchart of a presentation process in Embodiment 9.
Figure 25:
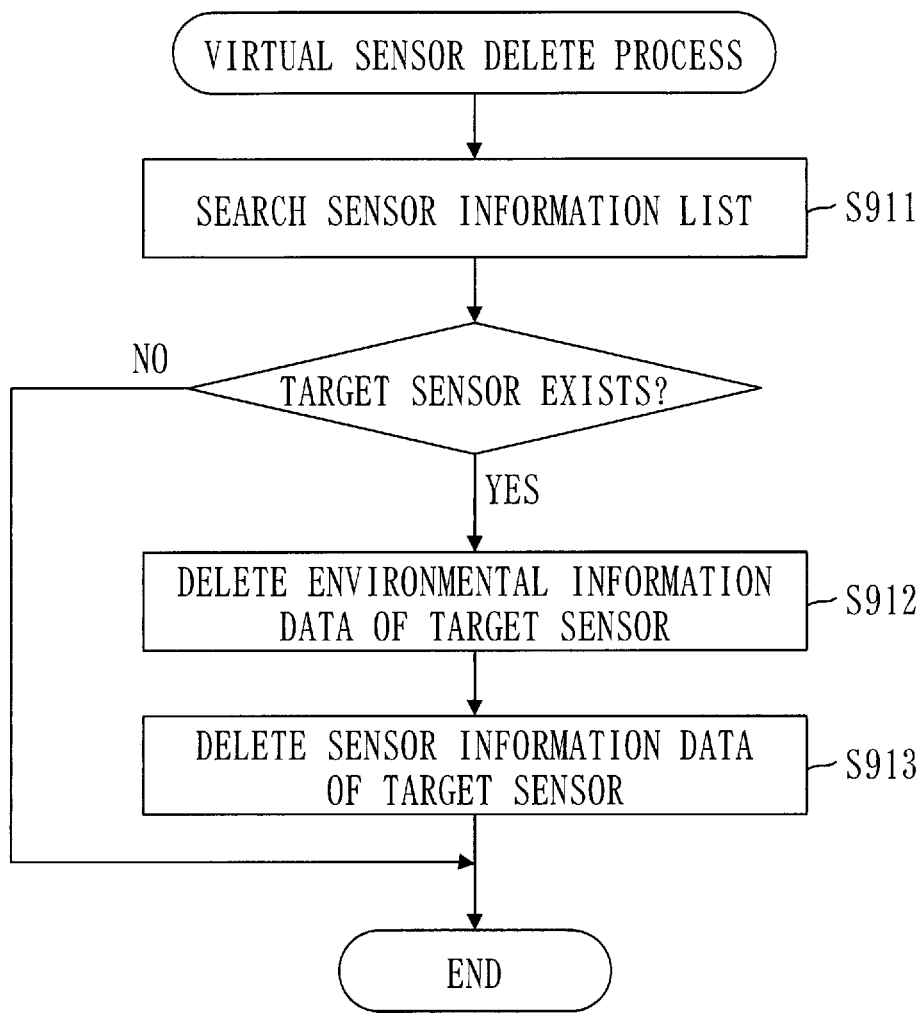
FIG. 25 is a flowchart of a virtual sensor delete process in Embodiment 9.

A mode for reducing a capacity necessary for accumulating environmental information data of a virtual point will be described with referring to FIGS. 23 to 25, mainly regarding its differences from Embodiments 5 to 8.
\*\*\*Description of Configuration\*\*\*
A configuration of an environmental information management device 100 is the same as a corresponding configuration in Embodiment 5 (see FIG. 13).
\*\*\*Description of Operations\*\*\*
An outline of an environmental information management method will be described.
When a delete suspension time has passed since environmental information data of a virtual point including a sensor value at the virtual point is sent as a response, a management unit 113 deletes the environmental information data, which has been sent as a response, of the virtual point from an accumulation unit 180. The delete suspension time is predetermined time duration.
A presentation process in the environmental information management method will be described with referring to FIG. 23.
Step S901 to step S903 are the same as step S501 to step S503, respectively, in Embodiment 5.
In step S904, a presentation unit 115 searches a sensor information list 191 to find a sensor information data group that matches with a search condition.
Then, per sensor information data that matches with the search condition, the presentation unit 115 updates a last-time presentation time point in sensor information data, with a present time point.
For example, when a sensor coordinate value is designated in the search condition, the presentation unit 115 updates a last-time presentation time point in sensor information data including the same sensor coordinate value as the designated sensor coordinate value, with the present time point.
The sensor information list 191 will be described with referring to FIG. 24.
The sensor information list 191 contains a plurality of pieces of sensor information data. Sensor information data 192 is sensor information data of a sensor 201. Sensor information data 193 is sensor information data of a virtual sensor.
Each sensor information data includes a last-time presentation time point. The last-time presentation time point is a time point at which environmental information data of a point provided with a sensor corresponding to the sensor information data is presented the last time.
In FIG. 24, "YYYY-MM-DD" expresses year, month, and day. In FIG. 24, "hh:mm:ss" expresses hour, minute, and second.
In step S622 of Embodiment 6 and step S842 of Embodiment 8, the presentation unit 115 updates a last-time presentation time point in sensor information data corresponding to presented environmental information data, as in step S904.
A virtual sensor delete process in the environmental information management method will be described with referring to FIG. 25.
The virtual sensor delete process is executed periodically. That is, the virtual sensor delete process is executed every time a predetermined period of time passes.
In step S911, the management unit 113 searches the sensor information list 191 to find sensor information data of a virtual sensor that has passed a delete suspension time.
When a time since the last-time presentation time point in the sensor information data of the virtual sensor until a present time point is longer than the delete suspension time, the sensor information data of the virtual sensor has passed the delete suspension time.
A virtual sensor corresponding to the sensor information data that has passed a delete suspension time is called a target sensor in step S911 to step S913.
If a target sensor exists, the processing proceeds to step S912.
If a target sensor does not exist, the virtual sensor delete process ends.
In step S912, the management unit 113 searches the accumulation unit 180 to find environmental information data of the target sensor.
Then, the management unit 113 deletes the environmental information data of the target sensor from the accumulation unit 180.
Specifically, the management unit 113 deletes environmental information data including the same sensor coordinate value as the sensor coordinate value of the target sensor, from the accumulation unit 180.
In step S913, the management unit 113 deletes the sensor information data of the target sensor from the sensor information list 191.
The sensor information data of the target sensor is the sensor information data found in step S911.

Effect of Embodiment 9

According to Embodiment 9, environmental information of a virtual sensor is deleted after a predetermined period of time passes since a reference request is issued for the environmental information of the virtual sensor. Therefore, a capacity necessary for accumulating the environmental information of the virtual sensor is reduced. Then, Embodiment 9 can be applied also to a product having a small memory area (for example, a built-in apparatus).

Embodiment 10

Figure 26:
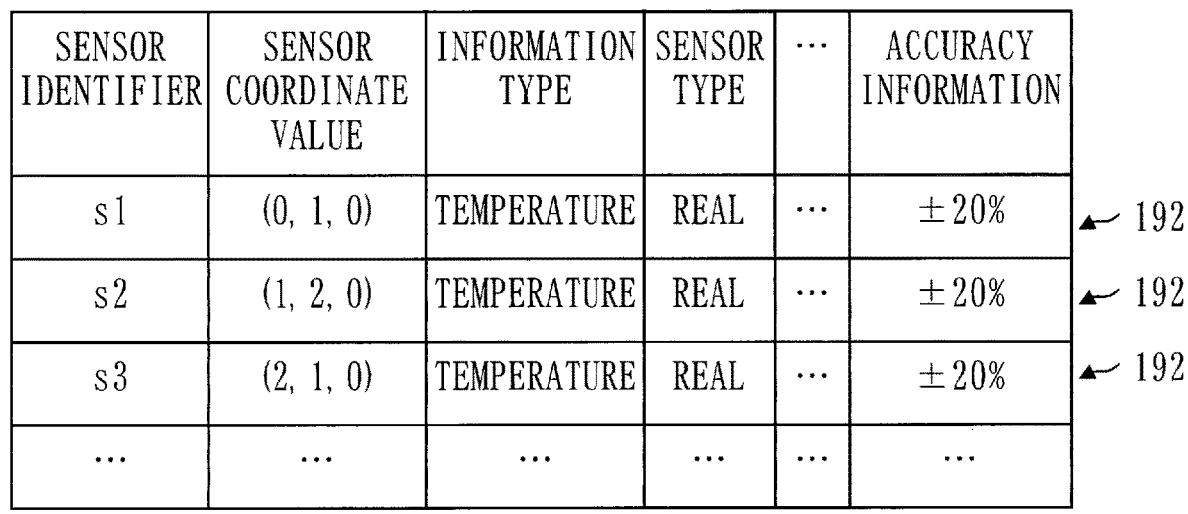
FIG. 26 is a diagram illustrating a sensor information list 191B in Embodiment 10.
Figure 28:
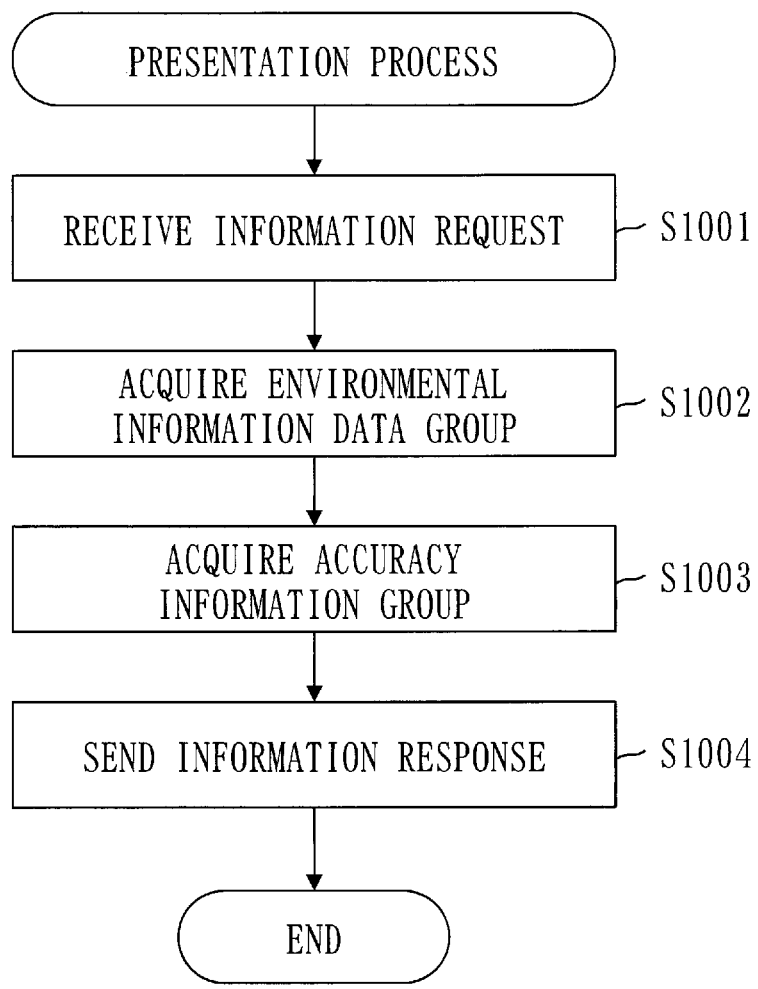
FIG. 28 is a flowchart of a presentation process in Embodiment 10.

A mode in which presentation of environmental information data added with accuracy information is enabled will be described with referring to FIGS. 26 to 28, mainly regarding its differences from Embodiments 5 to 9.

\*\*\*Description of Configuration\*\*\*

A configuration of an environmental information management device 100 is the same as a corresponding configuration in Embodiment 5 (see FIG. 13).

\*\*\*Description of Operations\*\*\*

An outline of an environmental information management method will be described.

A presentation unit 115 adds accuracy information to environmental information data to be sent as a response, and responds with the environmental information data added with the accuracy information.

The environmental information management method in detail will be described with referring to FIG. 3.

Steps other than step S113 are as described in Embodiment 1.

In step S113, a management unit 113 generates sensor information data of a virtual sensor and adds the sensor information data of the virtual sensor to a sensor information list.

The sensor information data of the virtual sensor includes accuracy information of a sensor value at a virtual point.

Specifically, the management unit 113 includes the accuracy information of the sensor value at the virtual point into the sensor information data of the virtual sensor as follows.

First, in order to find the sensor value at the virtual point, the management unit 113 extracts a sensor coordinate value from environmental information data including a sensor value referred to in step S112.

Subsequently, the management unit 113 selects sensor information data including the same sensor coordinate value as the extracted sensor coordinate value from a sensor information list 191.

Subsequently, the management unit 113 extracts accuracy information from the selected sensor information list 191.

Subsequently, the management unit 113 decides accuracy information of the sensor value at the virtual point, based on the extracted accuracy information.

Then, the management unit 113 sets the decided accuracy information to the sensor information data of the virtual sensor.

For example, if a sensor value at a measurement point which is the closest to the virtual point is referred to as the sensor value at the virtual point, the management unit 113 extracts accuracy information from sensor information data including the same sensor coordinate value as a coordinate value of the measurement point which is the closest to the virtual point. Then, the management unit 113 sets the extracted accuracy information to the sensor information data of the virtual sensor.

A sensor information list 191B will be described with referring to FIG. 26.

The sensor information list 191B contains sensor information data 192.

The sensor information data 192 is sensor information data of a sensor 201 and includes accuracy information of the sensor 201. For example, the accuracy information expresses a size of an error of a sensor value.

A sensor information list 191A will be described with referring to FIG. 27.

The sensor information list 191A contains sensor information data 193.

The sensor information data 193 is sensor information data of a virtual sensor and includes accuracy information of the virtual sensor.

For example, a sensor value of a virtual sensor v1 is found based on a sensor value of a sensor s1, a sensor value of a sensor s2, and a sensor value of a sensor s3. In this case, the management unit 113 sets representative accuracy information (such as an average, a maximum value, and a minimum value) of accuracy information of the sensor s1, accuracy information of the sensor s2, and accuracy information of the sensor s3, to the sensor information data 193.

A presentation process in the environmental information management method will be described with referring to FIG. 28.

Step S1001 and step S1002 are the same as step S501 and step S502, respectively, in Embodiment 5.

In step S1003, the presentation unit 115 acquires an accuracy information group corresponding to an environmental information data group acquired in step S1002, from the sensor information list 191.

Specifically, the presentation unit 115 acquires accuracy information per environmental information data acquired in step S1002, as follows.

First, the presentation unit 115 extracts a sensor coordinate value from environmental information data.

Subsequently, the presentation unit 115 selects sensor information data including the same sensor coordinate value as the extracted sensor coordinate value, from the sensor information list 191.

Then, the presentation unit 115 extracts accuracy information from the selected sensor information data.

In step S1004, the presentation unit 115 sends an information response to application software 211.

The information response includes the environmental information data group acquired in step S1002 and the accuracy information group acquired in step S1003. That is, the information response includes one suite or more each consisting of environmental information data and accuracy information.

In step S621 of Embodiment 6, step S841 of Embodiment 8, and step S902 of Embodiment 9, the presentation unit 115 acquires accuracy information of environmental information data to be presented, from the sensor information list 191 as in step S1003.

In step S622 of Embodiment 6, step S842 of Embodiment 8, and step S903 of Embodiment 9, the presentation unit 115 sends an information response including environmental information data added with accuracy information, as in step S1004.

Effect of Embodiment 10

According to Embodiment 10, as a response, accuracy information is sent together with environmental information. Therefore, in application software, it is possible to consider an error of interpolated environmental information.

Embodiment 11

Figure 30:
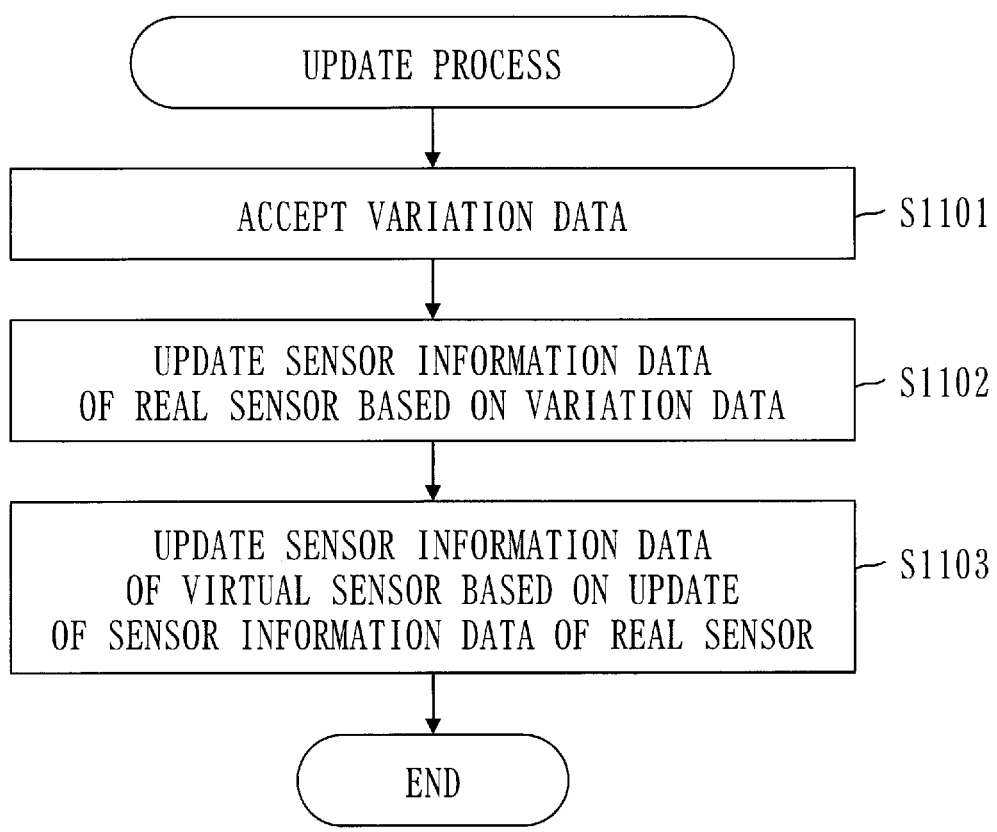
FIG. 30 is a flowchart of an update process in Embodiment 11.

A mode in which sensor information data of a virtual sensor is updated based on variations in a plurality of sensors 201 will be described with referring to FIGS. 29 and 30, mainly regarding its differences from Embodiments 1 to 10.

\*\*\*Description of Configuration\*\*\*

A configuration of an environmental information management device 100 is the same as a corresponding configuration in Embodiment 1 (see FIG. 1).

A configuration of an environmental information management system 200 is the same as a corresponding configuration in Embodiment 1 (see FIG. 2).

\*\*\*Description of Operations\*\*\*

An outline of an environmental information management method will be described.

In a sensor information list, sensor information data of a virtual sensor indicates a reference sensor corresponding to the virtual sensor.

The reference sensor is a sensor 201 from which a sensor value to be referred to for finding a sensor value at a virtual point is obtained.

A management unit 113 accepts variation data indicating variations in a plurality of sensors. Then, the management unit 113 updates a reference sensor to be indicated in the sensor information data of the virtual sensor, based on the variation data. The variations in the plurality of sensors refer to addition of a sensor, deletion of a sensor, and displacement of a sensor.

The environmental information management method in detail will be described with referring to FIG. 3.

Steps other than step S113 are as described in Embodiment 1.

In step S113, the management unit 113 generates sensor information data of the virtual sensor and adds the sensor information data of the virtual sensor to a sensor information list.

The sensor information data of the virtual sensor includes a sensor coordinate value corresponding to a sensor value referred to in step S112 for finding a sensor value at a virtual point. This sensor coordinate value is a sensor coordinate value of the reference sensor.

For example, if a sensor value at a measurement point which is the closest to the virtual point is selected as the sensor value at the virtual point, the sensor information data of the virtual sensor includes a coordinate value of the measurement point which is the closest to the virtual point.

A sensor information list 191A will be described with referring to FIG. 29.

The sensor information list 191A contains sensor information data 193.

The sensor information data 193 is sensor information data of a virtual sensor v1.

The sensor information data 193 includes a reference coordinate value and a status flag.

The reference coordinate value is a sensor coordinate value of the reference sensor.

The status flag represents a status of the sensor information data. The status of the sensor information data is valid or invalid.

In step S213 (see FIG. 8) of Embodiment 2, the management unit 113 adds the sensor information data of the virtual sensor to the sensor information list, as in step S113 of Embodiment 11.

An update process in the environmental information management method will be described with referring to FIG. 30.

In step S1101, variation data indicating variations in the plurality of sensors 201 is inputted to the environmental information management device 100.

The management unit 113 accepts the inputted variation data.

In step S1102, the management unit 113 updates sensor information data of a sensor 201 (real sensor) as follows based on the variation data.

If the variation data indicates addition of a sensor 201, the management unit 113 adds sensor information data of the added sensor 201 to a sensor information list 191.

If the variation data indicates deletion of a sensor 201, the management unit 113 deletes sensor information data of the deleted sensor 201 from the sensor information list 191.

If the variation data indicates displacement of a sensor 201, the management unit 113 selects sensor information data of the displaced sensor 201 from the sensor information list 191, and changes a sensor coordinate value included in the selected sensor information data to a coordinate value of an after-displacement measurement point.

In step S1103, the management unit 113 updates the sensor information data of the virtual sensor based on update of the sensor information data of the sensor 201 (real sensor).

Specifically, the management unit 113 changes a reference sensor indicated in the sensor information data of the virtual sensor. That is, the management unit 113 changes a reference coordinate value included in the sensor information data of the virtual sensor.

For example, the management unit 113 selects sensor information data of a sensor 201 which is the closest to the virtual sensor, extracts a sensor coordinate value from the selected sensor information data, and writes the extracted sensor coordinate value by overwriting in a field of a reference coordinate value in the sensor information data of the virtual sensor.

A sensor value at a measurement point of the reference sensor is referred to in a step of finding a sensor value at a virtual point of the virtual sensor.

Specifically, an interpolation unit 112 decides the reference sensor based on the sensor information data of the virtual sensor at the virtual point. The reference sensor is indicated in the sensor information data of the virtual sensor. Then, the interpolation unit 112 calculates a sensor value at the virtual point based on environmental information data of a measurement point corresponding to the reference sensor.

For example, assume that one reference coordinate value is included in the sensor information data of the virtual sensor. In this case, the interpolation unit 112 selects environmental information data including a sensor coordinate value that is the same as that reference coordinate value, and extracts a sensor value from the selected environmental information data. The sensor value to be extracted is the sensor value at the virtual point.

Effect of Embodiment 11

According to Embodiment 11, a virtual sensor is generated again when, for example, adding a real sensor. Therefore, it is possible to reduce an error included in the environmental information of the virtual sensor while taking into account an influence that addition of a real sensor or the like exerts on environmental information of the virtual sensor.

Supplement to Embodiments

Since interpolated environmental information (a sensor value at a virtual point) is accumulated, it is possible to read out the interpolated environmental information for any purpose and at any timing. For example, application software can access environmental information at any position without being conscious of whether a sensor exists at some position. Also, at which position in a building a sensor is installed is confidential information, and this information can be kept secret.

Figure 31:
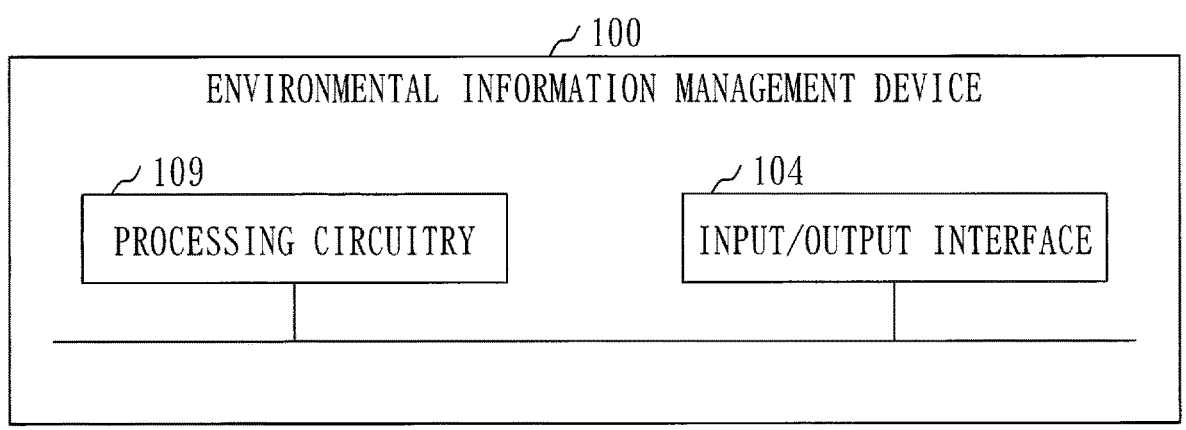
FIG. 31 is a hardware configuration diagram of the environmental information management device 100 in Embodiment.

A hardware configuration of the environmental information management device 100 will be described with referring to FIG. 31.

The environmental information management device 100 is provided with processing circuitry 109.

The processing circuitry 109 is hardware that implements the collection unit 111, the interpolation unit 112, the management unit 113, the visualization unit 114, and the presentation unit 115.

The processing circuitry 109 may be dedicated hardware, or may be the processor 101 which executes the program stored in the memory 102.

When the processing circuitry 109 is dedicated hardware, the processing circuitry 109 is, for example, a single circuit, a composite circuit, a programmed processor, a parallel-programmed processor, an ASIC, or an FPGA; or a combination of a single circuit, a composite circuit, a programmed processor, a parallel-programmed processor, an ASIC, and an FPGA.

Note that ASIC stands for Application Specific Integrated Circuit, and FPGA stands for Field Programmable Gate Array.

The environmental information management device 100 may be provided with a plurality of processing circuitries that substitute for the processing circuitry 109. The plurality of processing circuitries share a role of the processing circuitry 109.

In the processing circuitry 109, some of the functions may be implemented by hardware, and the remaining functions may be implemented by software or firmware.

In this manner, the processing circuitry 109 can be implemented by hardware, software, or firmware; or a combination of hardware, software, and firmware.

The functions of the environmental information management device 100 may be implemented by a plurality of devices.

For example, the environmental information management system 200 may be provided with a communication device provided to facilities having a monitored space 209 and a management device which is provided outside the facilities, in place of the environmental information management device 100. The communication device operates as the collection unit 111. The management device operates as the interpolation unit 112, the management unit 113, the visualization unit 114, and the presentation unit 115.

Each embodiment is an exemplification of a preferred mode and is not intended to limit the technical scope of the present invention. The embodiment may be practiced partly, or in combination with another embodiment. Procedures described with referring to flowcharts and the like may be changed as necessary.

REFERENCE SIGNS LIST

100: environmental information management device; 101: processor; 102: memory; 103: auxiliary storage device; 104: input/output interface; 109: processing circuitry; 111: collection unit; 112: interpolation unit; 113: management unit; 114: visualization unit; 115: presentation unit; 180: accumulation unit; 181: environmental information data; 182: environmental information data; 190: storage unit; 191: sensor information list; 192: sensor information data; 193: sensor information data; 200: environmental information management system; 201: sensor; 202: display; 209: monitored space; 210: environmental information utilization device; 211: application software.

The invention claimed is:

1. An environmental information management system comprising:
processing circuitry
to collect a plurality of sensor values at a plurality of measurement points from a plurality of sensors provided to the plurality of measurement points, and per measurement point, to accumulate environmental information data including a sensor value, in a storage,
to decide a plurality of virtual points based on the plurality of measurement points, so that the plurality of measurement points and the plurality of virtual points are arranged at a plurality of intersecting points of a grid, and
to find, per virtual point, a sensor value at a virtual point based on one sensor value or more obtained by one sensor or more,
wherein the processing circuitry accumulates, per virtual point, environmental information data including the sensor value at the virtual point, in the storage.

2. An environmental information management system comprising:
processing circuitry
to collect a plurality of sensor values at a plurality of measurement points periodically from a plurality of sensors provided to the plurality of measurement points, and per collection and per measurement point, to accumulate environmental information data including a sensor value, in a storage,
to find a sensor value at a virtual point, each time a sensor value at a measurement point changes, based on one sensor value or more obtained by one sensor or more, and
to accumulate, each time a sensor value at the virtual point is found, environmental information data including the sensor value at the virtual point.

3. An environmental information management system comprising:
processing circuitry
to collect a plurality of sensor values at a plurality of measurement points from a plurality of sensors provided to the plurality of measurement points, and per measurement point, to accumulate environmental information data including a sensor value, in a storage,
to find a sensor value at a virtual point based on one sensor value or more obtained by one sensor or more,
to accumulate environmental information data including the sensor value at the virtual point, in the storage, and
to accept an information request requesting one piece of environmental information data or more, to acquire the one piece of environmental information data or more from the storage, and to respond with the one piece of environmental information data or more,
wherein the information request indicates a designated point,
wherein when environmental information data including a sensor value at the designated point is not accumulated in the storage, the processing circuitry finds a sensor value at the designated point based on the one piece of environmental information data or more accumulated in the storage,
wherein when environmental information data including a sensor value at the designated point is not accumulated in the storage, the processing circuitry decides an additional point based on the designated point, and accumulates environmental information data including a sensor value at the designated point, in the storage,
wherein the processing circuitry responds with environmental information data including a sensor value at the designated point, wherein the processing circuitry finds a sensor value at the additional point based on the one piece of environmental information data or more accumulated in the storage, and wherein the processing circuitry accumulates environmental information data including a sensor value at the additional point, in the storage.

4. An environmental information management system comprising:

processing circuitry to collect a plurality of sensor values at a plurality of measurement points from a plurality of sensors provided to the plurality of measurement points, and per measurement point, to accumulate environmental information data including a sensor value, in a storage, to find a sensor value at a virtual point based on one sensor value or more obtained by one sensor or more, to accumulate environmental information data including the sensor value at the virtual point, in the storage, and to accept an information request requesting one piece of environmental information data or more, to acquire the one piece of environmental information data or more from the storage, to add accuracy information to each of the one piece of environmental information data or more, and to respond with the one piece of environmental information data or more.

5. An environmental information management system comprising:

processing circuitry to collect a plurality of sensor values at a plurality of measurement points from a plurality of sensors provided to the plurality of measurement points, and per measurement point, to accumulate environmental information data including a sensor value, in a storage, to find a sensor value at a virtual point based on one sensor value or more obtained by one sensor or more, and to accumulate environmental information data including the sensor value at the virtual point, in the storage, and to add sensor information data of a virtual sensor at the virtual point to a sensor information list containing a plurality of pieces of sensor information data of the plurality of sensors, wherein the sensor information data of the virtual sensor indicates a reference sensor from which a sensor value to be referred to for finding a sensor value at the virtual point is obtained, and wherein the processing circuitry accepts variation data indicating variations in the plurality of sensors, and updates the reference sensor to be indicated in the sensor information data of the virtual sensor, based on the variation data.

* * * * *